US011435963B2

(12) United States Patent
Tabuchi

(10) Patent No.: US 11,435,963 B2
(45) Date of Patent: Sep. 6, 2022

(54) PRINTING APPARATUS CONFIGURED FOR ENCRYPTED MUTUAL RECOGNITION COMMUNICATION AND NON-TRANSITORY COMPUTER-READABLE STORAGE MEDIUM CONFIGURED FOR ENCRYPTED MUTUAL RECOGNITION COMMUNICATION

(71) Applicant: BROTHER KOGYO KABUSHIKI KAISHA, Nagoya (JP)

(72) Inventor: Maya Tabuchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/144,071

(22) Filed: Jan. 7, 2021

(65) Prior Publication Data

US 2021/0208826 A1 Jul. 8, 2021

(30) Foreign Application Priority Data

Jan. 8, 2020 (JP) ............................ JP2020-001725

(51) Int. Cl.
*G06F 3/12* (2006.01)
*H04L 9/32* (2006.01)
(Continued)

(52) U.S. Cl.
CPC .......... *G06F 3/1229* (2013.01); *G06F 3/1221* (2013.01); *G06F 3/1236* (2013.01);
(Continued)

(58) Field of Classification Search
CPC .... G06F 3/1229; G06F 3/1221; G06F 3/1236; G06F 3/1287; H04L 9/3273; H04N 1/00891
(Continued)

(56) References Cited

U.S. PATENT DOCUMENTS 7,145,679 B2 * 12/2006 Hitaka .................. G06F 3/1288 358/1.14
9,563,389 B2 * 2/2017 Anezaki ................ G06F 3/1273
(Continued)

FOREIGN PATENT DOCUMENTS

JP 2005-85221 A 3/2005
JP 2005-262817 A 9/2005
(Continued)

*Primary Examiner* — Allen H Nguyen
(74) *Attorney, Agent, or Firm* — Kenealy Vaidya LLP

(57) ABSTRACT

A printing apparatus including: a printing unit configured to perform printing on a printing medium; and a controller, wherein the printing apparatus is configured to perform communication with an external mediation apparatus configured to perform communication with a management server via the Internet, and wherein the controller is configured to: try to acquire time information necessary for encrypted mutual recognition communication; determine whether the time information has been successfully acquired; and not executing information transmission and reception with respect to the external mediation apparatus by the mutual recognition communication in a case where the determining does not determine that the time information has been successfully acquired, and execute the information transmission and reception with respect to the external mediation apparatus by the mutual recognition communication in a case where the determining determines that the time information has been successfully acquired.

10 Claims, 15 Drawing Sheets

(51) Int. Cl.
*G06F 21/60* (2013.01)
*H04N 1/00* (2006.01)

(52) U.S. Cl.
CPC ....... *H04L 9/3273* (2013.01); *H04N 1/00891* (2013.01); *G06F 3/1287* (2013.01)

(58) Field of Classification Search
USPC ........................................................ 358/1.14
See application file for complete search history.

(56) References Cited

U.S. PATENT DOCUMENTS

| | | | |
|---|---|---|---|
| 2006/0007487 | A1 | 1/2006 | Okazawa |
| 2019/0306115 | A1 | 10/2019 | Nishizaki |

FOREIGN PATENT DOCUMENTS

| | | | |
|---|---|---|---|
| JP | 2006-21489 | A | 1/2006 |
| JP | 2018-202842 | A | 12/2018 |
| JP | 2019-179446 | A | 10/2019 |

* cited by examiner

FIG. 2

CORRESPONDENCE DATABASE

| DEVICE ID | GUID | LOCATION INFORMATION | FIRM VERSION | SETTING INFORMATION | | | | UPDATE DATE AND TIME | STATE INFORMATION |
|---|---|---|---|---|---|---|---|---|---|
| | | | | FONT | FONT SIZE | CONCENTRATION | … | | |
| 001 | 00A | A BRANCH | 2 | GOTHIC | 14 | 3 | … | 2018.04.01 | UNDER MANAGEMENT |
| 002 | 00A | A BRANCH | 3 | GOTHIC | 14 | 3 | … | 2018.04.03 | UNDER MANAGEMENT |
| 003 | 00A | A BRANCH | 2 | GOTHIC | 14 | 3 | … | 2018.04.02 | UNDER MANAGEMENT |
| 004 | 00B | B BRANCH | 2 | GOTHIC | 12 | 2 | … | 2018.04.02 | UNDER MANAGEMENT |
| 005 | 00B | B BRANCH | 2 | GOTHIC | 12 | 2 | … | 2018.04.03 | UNDER MANAGEMENT |
| 006 | 00C | C BRANCH | 2 | MINGCHO | 12 | 2 | … | 2018.04.02 | UNDER MANAGEMENT |
| 007 | 00C | C BRANCH | 1 | MINGCHO | 14 | 3 | … | 2018.04.02 | UNDER MANAGEMENT |
| 008 | 00C | C BRANCH | 2 | MINGCHO | 12 | 2 | … | 2018.04.02 | UNDER MANAGEMENT |
| 009 | 00C | C BRANCH | - | - | - | - | … | - | UNDER STANDBY |
| .... | .... | .... | .... | .... | .... | .... | .... | .... | .... |

PRINTING APPARATUS CONFIGURED FOR ENCRYPTED MUTUAL RECOGNITION COMMUNICATION AND NON-TRANSITORY COMPUTER-READABLE STORAGE MEDIUM CONFIGURED FOR ENCRYPTED MUTUAL RECOGNITION COMMUNICATION

CROSS-REFERENCE TO RELATED APPLICATIONS

This application is based upon and claims the benefit of priority from prior Japanese patent application No. 2020-001725, filed on Jan. 8, 2020, the entire contents of which are incorporated herein by reference.

TECHNICAL FIELD

An aspect of the present disclosure relates to a printing apparatus configured to perform printing on a printing medium, and a non-transitory computer-readable storage medium storing a computer program that is executed a computer of an electronic device.

BACKGROUND ART

Known is an MDM (Mobile Device Management) system where a management server on the Internet performs communication with a mobile device to manage the mobile device. In related-art technology, an external mediation apparatus (Device Conductor) is communicatively connected to the management server configured to manage printers, via the Internet. An internal mediation apparatus is communicatively connected to the external mediation apparatus, and a printer that is the mobile device is configured to perform communication with the internal mediation apparatus via a local network.

In recent years, instead of the configuration of the related-art technology where the internal mediation apparatus is used for information transfer between the printing apparatus, which is an electronic device, and the external mediation apparatus, proposed is a configuration where the printing apparatus is directly connected to the external mediation apparatus. In this case, the printing apparatus performs communication with the external mediation apparatus in an encrypted mutual recognition wireless communication manner. In order to perform the communication, it is necessary to verify mutual electronic certificates. Usually, since a period of validity is set for the electronic certificate, it is necessary for the printing apparatus to acquire time information in advance so as to verify the electronic certificates.

However, the printing apparatus that is used for the MDM system may not have therein a function (for example, so-called real time clock) of generating time information, from a standpoint of emphasizing portability. In this case, the electronic certificates are verified without the time information until the time information is acquired in any manner, so that a collation error is continuously caused. This leads to an increase in communication traffic between the printing apparatus and the external mediation apparatus and an increase in consumption of a battery in the printing apparatus.

SUMMARY

Aspects of the present disclosure provide a printing apparatus and a non-transitory computer-readable storage medium, which are capable of avoiding an increase in communication traffic between the printing apparatus and an external mediation apparatus and an increase in consumption of a battery in the printing apparatus.

According to an aspect of the present disclosure, there is provided a printing apparatus including: a printing unit configured to perform printing on a printing medium; and a controller, wherein the printing apparatus is configured to perform communication with an external mediation apparatus configured to perform communication with a management server via the Internet, and wherein the controller is configured to: try to acquire time information necessary for encrypted mutual recognition communication; determine whether the time information has been successfully acquired; and not executing information transmission and reception with respect to the external mediation apparatus by the mutual recognition communication in a case where the determining does not determine that the time information has been successfully acquired, and execute the information transmission and reception with respect to the external mediation apparatus by the mutual recognition communication in a case where the determining determines that the time information has been successfully acquired.

The printing apparatus of the present disclosure is used in a so-called MDM (Mobile Device Management) system. That is, the external mediation apparatus (so-called Device Conductor) is communicatively connected to the management server configured to manage the printing apparatus, via the Internet, and the printing apparatus is communicatively connected to the external mediation apparatus. At this time, the printing apparatus performs communication with the external mediation apparatus in an encrypted mutual recognition wireless communication manner. In order to perform the communication, it is necessary to verify mutual electronic certificates. Usually, since a period of validity is set for the electronic certificate, it is necessary for the printing apparatus to acquire time information in advance so as to verify the electronic certificates.

According to another aspect of the present disclosure, there is provided a non-transitory computer-readable storage medium storing a computer program readable by a computer of an electronic device configured to perform communication with an external mediation apparatus configured to perform communication with a management server via the Internet, the computer program, when executed by the computer, causing the electronic device to perform: trying to acquire time information necessary for encrypted mutual recognition communication; determining whether the time information has been successfully acquired; and not executing information transmission and reception with respect to the external mediation apparatus by the mutual recognition communication in a case where the determining does not determine that the time information has been successfully acquired, and executing the information transmission and reception with respect to the external mediation apparatus by the mutual recognition communication in a case where the determining determines that the time information has been successfully acquired.

BRIEF DESCRIPTION OF DRAWINGS

FIG. 2 illustrates a correspondence database

DESCRIPTION OF EMBODIMENTS

An embodiment of the present disclosure will be described with reference to the drawings.

<System Outline>

Figure 1:
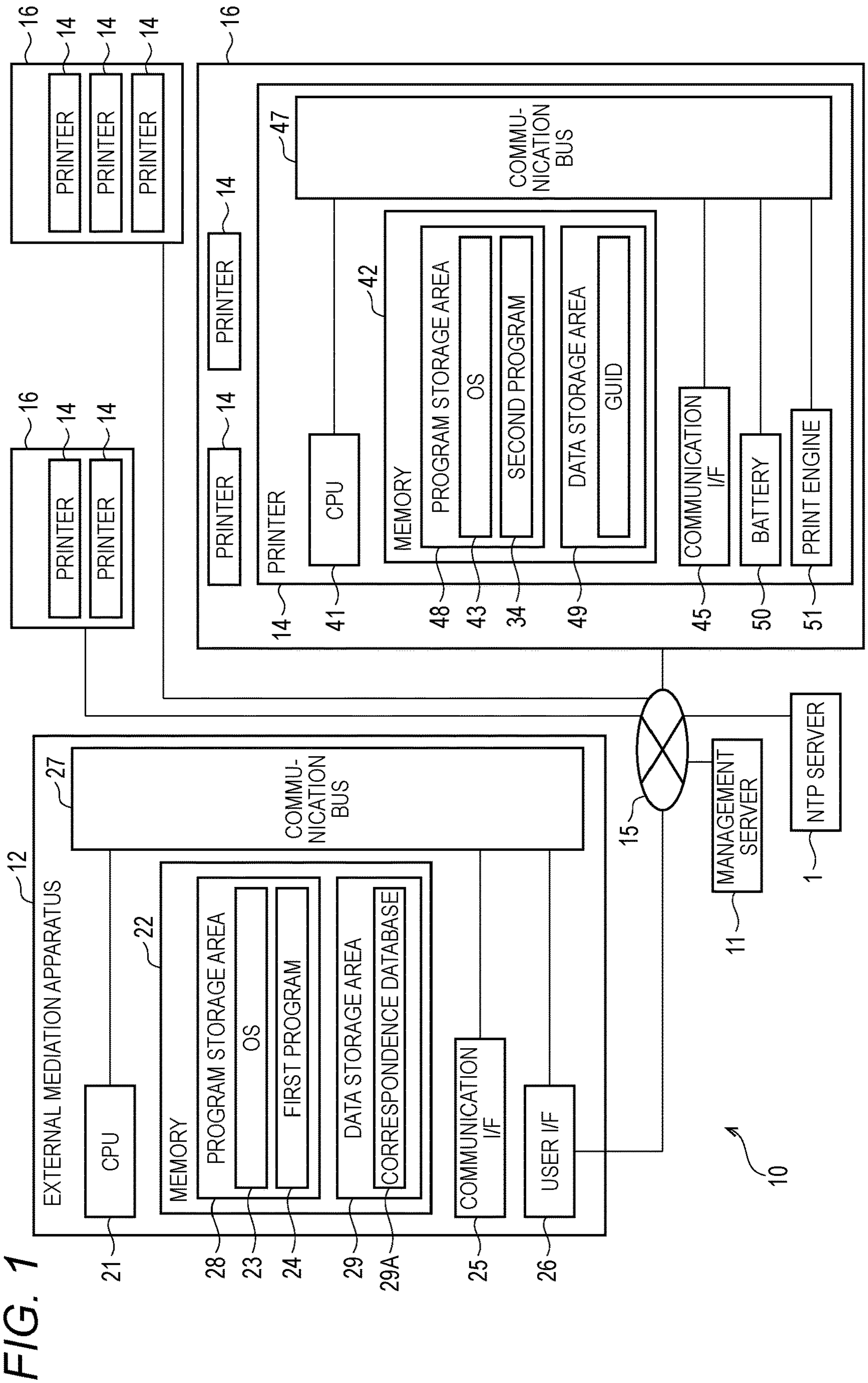
FIG. 1 is a schematic configuration view of a management system in accordance with an embodiment of the present disclosure.

In FIG. 1, a management system 10 of the present embodiment is a system configured to manage a printer 14 by using a so-called mobile device management system. An administrator of the printer 14 browses management information of the printer 14 stored in the management server 11 by using a browser or instructs the printer 14 to change setting information, for example, through the management server 11.

Also, the management system 10 is a system configured to manage a printer 14 having no function of directly performing communication with the management server 11. An external mediation apparatus 12 is used so that the management server 11 can manage the printer 14 having no function of directly performing communication with the management server 11. The printer 14 is an example of the printing apparatus, and is also an example of the electronic device.

The management system 10 includes the management server 11 and the external mediation apparatus 12, which are connected to the Internet 15, the printer 14 connected to a local network 16, and an NTP server 1. Details of the NTP server 1 will be described later.

The management server 11 is a server of a company that provides service to manage mobile devices, for example. The external mediation apparatus 12 is a server of a company that receives the service to manage mobile devices, for example. The local network 16 is established at each branch of the company that receives the service to manage mobile devices, for example. Each branch has one or more printers 14, and the printers 14 at each branch are each connected to the local network 16 at each branch.

In the shown example, the three local networks 16 are established, and the two or three printers 14 are connected to each local network 16. Note that, the number of the local networks 16 in the management system 10 and the number of the printers 4 connected to each local network 16 are not limited to the shown example.

The management server 11 and the external mediation apparatus 12 can perform communication with each other via the Internet 15. Specifically, the management server 11 and the external mediation apparatus 12 each have a global IP address, and perform communication with each other by using Internet protocols using the global IP addresses.

The local network 16 is a so-called intranet, and is, for example, a wired LAN, a wireless LAN, a WAN, or a combination thereof. The printers 14 connected to the local network 16 can perform communication with each other by using a communication protocol such as TCP/IP. Specifically, the printers 14 perform communication with each other by using private IP addresses or MAC addresses.

The local network 16 includes a relay apparatus (not shown) such as a router. The relay apparatus has a global IP address, and is connected to the Internet 15. The printer 14 connected to the local network 16 performs communication with the external mediation apparatus 12 via the relay apparatus. Specifically, the printer 14 and the external mediation apparatus 12 perform communication with each other through a firewall established by the relay apparatus. Note that, the firewall is not necessarily required. That is, in a case where the firewall is not necessary or is less necessary, the relay apparatus may not have the firewall.

The management system 10 is a system that enables management of the printer 14 having no function of directly performing communication with the management server 11 to be implemented in the management server 11 by using the external mediation apparatus 12 configured as described above. Specifically, the management of the printer 14 having no function of directly performing communication with the management server 11 is implemented using a first program 24 that is installed and executed in the external mediation apparatus 12 and a second program 34 that is installed and executed in the printer 14. That is, the management of the printer 14 having no function of directly performing communication with the management server 11 by the management server 11 is implemented by the first program 24 and the second program 34. In the below, the configurations of the external mediation apparatus 12 and the printer 14 are described in detail.

<External Mediation Apparatus (Part 1)>

The external mediation apparatus 12 includes a CPU 21, a memory 22, a communication interface 25 (hereinbelow, referred to as "communication I/F 25"), a user I/F 26, and a communication bus 27. The CPU 21, the memory 22, the communication I/F 25, and the user I/F 26 are connected to the communication bus 27.

The memory 22 is a ROM, a RAM, an EEPROM, an HDD, a portable storage medium such as a USB memory, or a buffer provided in the CPU 21. The memory 22 may also be a computer-readable storage medium. The computer-readable storage medium is a non-transitory medium. The non-transitory includes also recording media such as a CD-ROM, a DVD-ROM and the like, in addition to the above example. Also, the non-transitory medium is a tangible medium. Note that, an electric signal for carrying a program that is downloaded from a server or the like on the Internet is a computer-readable signal medium that is a kind of the computer-readable medium but is not included in the non-transitory computer-readable storage medium. The same holds true for a memory 42 of the printer 14, which will be described later.

The memory 22 has a program storage area 28 and a data storage area 29. In the program storage area 28, programs such as an OS 23, the first program 24 and the like are stored.

The OS 23 is a basic program of the external mediation apparatus 12. The OS 23 is an operating system such as MacOS (registered trademark), Windows (registered trademark), Linux (registered trademark), Android (registered trademark) OS and the like.

The first program 24 is a program for controlling communication with the management server 11 and the printer 14 via the communication I/F 25 in cooperation with the OS 23. The first program 24 may be a single program or a group of a plurality of programs. The processing that is executed by the first program 24 will be described later.

In the data storage area 29, data necessary for execution of the programs are stored. Also, in the data storage area 29, a correspondence database shown in FIG. 2 is stored.

<Correspondence Database>

In FIG. 2, a correspondence database has a plurality of items and a plurality of records. In the present example, the plurality of items includes items "device ID", "GUID", "location information". "firm version", "setting information", "update date and time", and "state information". Note that, the correspondence database may also include items other than the above-described items.

The item "device ID" is an ID allotted to the printer 14. The device ID is, for example, a MAC address, an IP address, a serial number or the like of the printer 14. Each record is identified by the device ID. That is, one record is generated for one printer 14.

The item "GUID" indicates a GUID allotted to the second program 34 (which will be described later) provided in the printer 14. Note that, as the GUID, any GUID such as numbers, characters and the like can be used inasmuch as it can identify the second program 34. The same holds true for the device ID.

The item "location information" indicates the local network 16 to which the printer 14 having the second program 34 indicated by the item "GUID" belongs. The item "location information" is, for example, a branch name, a branch office name or the like.

The item "firm version" indicates a version of the second program 34 (which will be described later) installed in the printer 14. Note that, the larger number of the item "firm version" indicates a newer version.

The item "setting information" has a plurality of subdivided items such as an item "font", an item "font size", an item "concentration" and the like. The item "font" means a font of characters that are printed by the printer 14. The item "font size" means a size of characters that are printed by the printer 14. The item "concentration" means a concentration of ink of characters and figures that are printed by the printer 14. The item "setting information" may also have other items such as an item indicating whether an automatic power supply-off function is valid or invalid, an item indicating a printing speed, an item indicating setting parameters of communication, and the like, in addition to the above-described items.

The item "update date and time" indicates date and time when a content indicated by each item in the record is changed.

The item "state information" indicates whether the printer 14 of each record is a management target by the management system 10. "Under management" means that the printer 14 is a management target by the management system 10. "Under standby" means that the printer 14 is not a management target by the management system 10.

<External Mediation Apparatus (Part 2)>

Returning to FIG. 1, the communication I/F 25 of the external mediation apparatus 12 is an interface capable of performing communication with the management server 1 and the printer 14. The communication I/F 25 is a LAN I/F and a wireless LAN I/F. The external mediation apparatus 12 and the printer 14 perform communication with each other via the communication I/F 25, the Internet 15, the firewall (relay apparatus), the local network 16, and a communication I/F 45.

The user I/F 26 is, for example, a keyboard, a mouse and the like, and is configured to receive an administrator's input.

<Printer>

The printer 14 includes a CPU 41, a memory 42, a communication I/F 45, a battery 50, a print engine 51, and a communication bus 47. Note that, the print engine is an example of the printing unit, and the CPU 41 is an example of the controller, and is also an example of the computer. The configurations of the CPU 41, the memory 42, the communication I/F 45, and the communication bus 47 are similar to those of the CPU 21, the memory 22, the communication IF 25, and the communication bus 27 of the external mediation apparatus 12.

The memory 42 has a program storage area 48 and a data storage area 49. In the program storage area 48, programs such as an OS 43, a second program 34 and the like are stored. In the data storage area 49, data necessary for execution of the programs are stored. Also, in the data storage area 49, a device ID and a GUID (Globally Unique Identifier) are stored. The device ID is, for example, a MAC address, a private IP address, a serial number or the like of the printer 14.

The OS 43 is a basic program of the printer 14. The second program 34 is a program for causing the print engine 51 to perform printing on an appropriate printing medium and controlling communication with the external mediation apparatus 12 via the communication I/F 45 in cooperation with the OS 43. The second program 34 may be a single program or a group of a plurality of programs. The processing that is executed by the second program 34 will be described later. Note that, the second program 34 is an example of the computer program.

The communication IF 45 is an interface capable of performing communication with the external mediation apparatus 12. The communication I/F 45 is configured to receive a command transmitted from the external mediation apparatus 12, and to transmit a response to the command to the external mediation apparatus 12.

The battery 50 is, for example, a secondary battery that can be charged and discharged. In a case where the printer 14 is connected to a commercial power supply, the battery 50 is charged by the commercial power supply, and in a case where the printer 14 is not connected to a commercial power supply, the battery is discharged, thereby supplying drive power to the print engine 51 and the CPU 41.

<Processing of Programs>

In the below, processing that is executed by the first program 24 and the second program 34 is described.

In the present specification, the processing of the CPU that is executed according to commands described in programs is mainly described. That is, in descriptions below, the processing such as "determination", "extraction", "selection", "calculation", "decision", "specifying", "acquisition", "receiving", "control", "setting" and the like indicates the processing of the CPU. The processing that is executed by the CPU includes hardware control via a controller such as an OS. Note that, "acquisition" is used as a concept that does not necessarily require a request. That is, processing of receiving data without a request of the CPU is also included in the concept that "the CPU acquires data". The processing such as "command", "response", "request" and the like is performed by communicating information indicative of "command". "response". "request" and the like. Also, words such as "command", "response", "request" and the like may be described as meanings of information indicative of "command", "response", "request" and the like.

Also, the processing of the CPU that is executed according to commands described in programs may be described in abbreviated words, such as "the CPU 21 performs", "the program 24 performs", "the external mediation apparatus 12 performs", and the like. The same holds true for the CPU 41. Also, the processing of inputting and outputting information by the program via the communication I/F and the user I/F may be described in abbreviated words, such as "the CPU 21 receives", "the program 24 transmits", "the external mediation apparatus 12 acquires", and the like.

Also, in the present specification, "data" and "information" are common in that they are bits orbit strings that can be treated by a computer. "Data" indicates that semantic content expressed by each bit can be treated without the computer considering the same. In contrast. "information" indicates that operations of the computer are branched by semantic content expressed by each bit. Note that, "data" of different formats are treated as the same data when the semantic content of the data is substantially the same. The same holds true for "information". Also, "instruction" is a control signal for urging a device of a transmission destination to perform a next operation, and may include information or "instruction" itself may have a nature of information.

Also, "data" and "information" are treated as the same data and information inasmuch as the semantic content thereof is recognized as the same, even though a format (for example, a text format, a binary format, a flag format and the like) thereof is changed for each computer. For example, information indicative of "two" may be held as information of a text format such as ASCII code "0x32" in some computers, and may be held as information of a binary format such as a binary number indication "10" in other computers.

However, the "data" and the "information" are not strictly distinguished and may be treated exceptionally. For example, the data may be temporarily treated as the information, and the information may be temporarily treated as the data. Also, the data treated in one device may be treated as the information in another device. Furthermore, the information may be taken out from the data, and the data may be taken out from the information.

<Basic Processing Contents of Programs> in the below, processing that is executed by the first program 24 of the external mediation apparatus 12 and the second program 34 of the printer 14 is described with reference to FIGS. 3 to 6B. Although described in detail later, when transmitting and receiving information between the external mediation apparatus 12 and the printer 14, the external mediation apparatus 12 basically transmits information such as an instruction to the printer 14, in a form of being included in an HTTP response to an HTTP request received from the printer 14. For this reason, the printer 14 periodically transmits the HTTP request to the external mediation apparatus 12. Note that, the firewall blocks transmission from the external mediation apparatus 12 to the printer 14, except the HTTP response to the HTTP request transmitted from the printer 14.

<Registration of Printer>

First, processing of registering the device ID of the printer 14 on the correspondence database stored in the memory 22 of the external mediation apparatus 12 and starting management of the management system 10 is described with reference to FIG. 3.

First, in a case where the second program 34 is activated for the first time and initial setting of the second program 34 is executed, or according to a registration instruction input by a person in charge and instructing the printer 14 that is a management target to be registered on the management system 10 or in a case where a registration instruction transmitted from the first program 24 of the external mediation apparatus 12 is received, for example, the second program 34 of the printer 14 initializes a time information acquisition flag F, which indicates that time information to be described later is acquired, to 0 (step S11). Note that, the flowchart shown in FIG. 3 is executed each time when the power of the printer 14 is turned on. Therefore, the time information acquisition flag F is initialized to 0 in step S11 each time when the power of the printer 14 is turned on. Then, the second program 34 transmits an HTTP request, which includes a device ID of the printer and a GUID of the second program stored in the memory 32, to the external mediation apparatus 12 (step S14). Note that, in the specification, the "person in charge" is, for example, a person who manages the printer 14 at each branch and is different from an administrator who operates the external mediation apparatus 12.

The HTTP request transmitted from the second program 34 of the printer 14 and including the device ID and the GUID is received by the external mediation apparatus 12 (step S14). When the device ID and the GUID are received, the first program 24 of the external mediation apparatus 12 determines whether the received device ID is registered already on the correspondence database. When it is determined that the received device ID is not registered, the first program 24 registers a new record on the correspondence database by using the received device ID and GUID (step S15).

Although not shown in the flowchart, the first program 24 of the external mediation apparatus 12 returns an HTTP response including a response indicating that the device ID is received to the printer 14, as a response to the HTTP received in step S14. Alternatively, the first program 24 of the external mediation apparatus 12 may return an HTTP response including the device ID registered on the correspondence database to the printer 14, as a response to the HTTP received in step S14.

At this time, in the record newly added to the database as described above, "under standby" that is an initial value is stored in the item "state information". In the example of FIG. 2, the record indicative of the printer 14 having the device ID "009" is the newly added record. The printer 14 indicated by the record that is "under standby" is not registered yet on the management server 11. That is, it can be said that the corresponding printer is in a temporarily registered state where it is not set as a management target of the management system 10. Note that, in the record indicative of the printer 14 set as a management target, the "state information" is changed from "under standby" to "under management".

On the other hand, when it is determined that the received device ID is registered already on the correspondence database, the first program 24 of the external mediation apparatus 12 returns a response, which indicates that the received device ID is registered already on the correspondence database, to the printer 14.

Returning to FIG. 3, the first program 24 of the external mediation apparatus 12 determines whether a deletion instruction is input (step S16). The deletion instruction is, for example, an instruction that is input to the external mediation apparatus 12 by the administrator. For example, the first program 24 displays on a display of the external mediation apparatus 12 that a record is generated and is registered on the correspondence database. The administrator who checks the display displays the correspondence database on the display of the external mediation apparatus 12, and determines whether the printer 14 indicated by the device ID that is "under standby" is a printer 14 that is a management target. The administrator inputs the deletion instruction for the device ID of the printer 14 that is not a target to be managed by the management system 10. That is, it is checked whether the device ID registered on the correspondence database is appropriate by the administrator of the external mediation apparatus 12.

When it is determined that the deletion instruction is input (step S16: Yes), the first program 24 of the external mediation apparatus 12 deletes a record for which the deletion instruction is input from the correspondence database (step S17). On the other hand, when it is determined that the deletion instruction is not input, the first program 24 of the external mediation apparatus 12 skips over the processing of step S17.

Then, the first program 24 of the external mediation apparatus 12 stands by until a management start instruction to start management of the management system 10 is input (step S18: No). When it is determined that the management start instruction is input (step S18: Yes), the first program 24 transmits a command to the management server 11 (step S19). The command includes the device ID registered on the correspondence database, as ancillary information. Also, the command is a command to request the management server 11 to register the included device ID, as the device ID of the printer 14 that is a management target.

Note that, the first program 24 of the external mediation apparatus 12 may receive an input of an instruction to reject the management start, in step S18. In this case, in step S22, the first program 24 transmits an HTTP response, which indicates that an instruction to reject the management start is input, to the second program 34 of the printer 14. In a case where the HTTP response is received, the second program 34 displays information, which indicates that the instruction to reject the management start is input to the external mediation apparatus 12, on the display of the printer 14, for example. The person in charge can check by the displayed information that the instruction to reject the management start is input to the external mediation apparatus 12.

The command transmitted by the external mediation apparatus 12 is received by the management server 11 (step S19). The management server 11 that receives the command stores the device ID included in the received command in a memory (not shown). That is, the management server 11 registers the device ID included in the received command, as the device ID of the printer 14 that is a management target. Then, the management server 11 returns a response, which indicates that the device ID included in the command is registered, to the external mediation apparatus 12 via the Internet 15 (step S20).

The response returned by the management server 11 is received by the external mediation apparatus 12 (step S20). In a case where the response from the management server 11 is received, the first program 24 of the external mediation apparatus 12 starts management of the management system 10 (step S21). Specifically, the first program 24 changes the item "state information" in the database shown in FIG. 2 from "under standby" to "under management".

Then, the first program 24 of the external mediation apparatus 12 transmits the device ID that is "under management", i.e., the device ID of the printer 14 for which management has started to the printer 14, as an HTTP response to the HTTP request periodically transmitted by the printer 14 (step S22). At this time, the device ID deleted in S17 is not transmitted.

Note that, the first program 24 of the external mediation apparatus 12 may transmit the HTTP response in step S22 to the printer 14, as a response to the HTTP request received in step S14. In this case, the processing of step S16 and step S17 is preferably omitted so that a timeout does not occur.

Although not shown in the flowchart, when the device ID for which management has started is received (step S22), the second program 34 of the printer 14 stores the device ID for which management has started in the memory 42. The second program 34 displays, on the display of the printer 14, for example, that the device ID for which management has started is received, thereby causing the person in charge to recognize the same. The person in charge can display the device ID stored in the memory 42 on the display of the printer 14 and check that management for the printer 14 has started. Note that, the administrator of the external mediation apparatus 12 can check the printer 14 for which management has started by displaying the correspondence database stored in the memory 22 on the display of the external mediation apparatus 12. Also, the administrator of the external mediation apparatus 12 can check the printer 14 for which management has started by displaying data stored in the management server 1 on the display with a browser.

<Processing That Is Executed By Instruction From Management Server (Other than Status Reporting)>

Subsequently, a command corresponding to an instruction from the management server 11 is input to the printer 14 having a device ID of a record in which the item "state information" is "under management". That is, the printer 14 is managed by the management server 11. The management is described in detail with reference to FIGS. 4 and 5. Note that, an instruction to the management server 11 is input to the management server 11 by the administrator with a browser.

First, the management server 11 transmits a first instruction command to the external mediation apparatus 12, via the Internet 15 (step S31). The first instruction command is a command for causing the external mediation apparatus 12 to execute an instruction corresponding to an instruction that is executed by the printer 14. The first instruction command includes a device ID for specifying the printer 14 that is caused to execute the instruction, as ancillary information.

In the present example, the first instruction command is an instruction for changing setting values of the printer 14 with respect to each item of "font". "font size", "concentration" and the like of the setting information (FIG. 2), an instruction to update a firm version (FIG. 2) of the second program 34 of the printer 14, and the like, and the like, for example. Note that, the contents instructed by the first instruction command are not limited to the above examples.

The first program 24 of the external mediation apparatus 12 receives the first instruction command transmitted from the management server 11 (step S31).

In a case where the first instruction command is received (step S31), the first program 24 of the external mediation apparatus 12 transmits a notification, which indicates that the first instruction command is received, to the management server 11 (step S32).

When the first instruction command is received (step S31), the first program 24 of the external mediation apparatus 12 specifies a GUID associated with the device ID included in the first instruction command, from the correspondence database. That is, the first program 24 specifies the second program 34 of the printer 14 to which the instruction is to be transmitted by the GUID. Specifically, the first program 24 specifies a record having the device ID included in the first instruction command, from the correspondence database, and specifies a GUID of the item "GUID" in the specified record, as a corresponding GUID (step S33).

Then, the first program 24 of the external mediation apparatus 12 generates a second instruction command corresponding to an instruction of the first instruction command (step S34). The second instruction command is a command that can be input to the printer 14 and is generated according to a content instructed by the first instruction command. The second instruction command includes the device ID included in the first instruction command, as ancillary information.

Although not shown in FIG. 2, in the data storage area 29 of the memory 22 of the external mediation apparatus 12, a first command list is stored. The first command list shows a correspondence between the first instruction command and the second instruction command. The first program 24 of the external mediation apparatus 12 generates a second instruction command by deciding a second instruction command corresponding to the first instruction command received in step S31 from the first command list, and including the device ID included in the first instruction command in the decided second instruction command, as ancillary information (step S34).

Also, although not shown, when an instruction indicated by the first instruction command is file transmission to the printer 14, the first program 24 of the external mediation apparatus 12 requests a file of a transmission target from the management server 11. The management server 11 that receives the request transmits a file to the external mediation apparatus 12. The first program 24 receives and stores the file in the memory 22. For example, a file in which a text to instruct the printer 14 to change a setting is included, a program file of the second program 34 of a new version, and the like are examples of the file of the transmission target. When the file is received from the management server 11, the first program 24 generates a second instruction command to instruct the second program of the printer 14 to download the file, in step S34.

After generating the second instruction command, the first program 24 of the external mediation apparatus 12 stands by until an HTP request is received from the printer 14.

In the meantime, the second program 34 of the printer 14 first initializes the time information acquisition flag F to 0 (step S29). However, when the processing is executed continuously from the flowchart of FIG. 3, the processing of step S29 is skipped. That is, the flowchart of FIG. 4 is executed each time when the power of the printer 14 is turned on, except for the case where the processing is executed continuously from the flowchart of FIG. 3. Therefore, the time information acquisition flag F is initialized to 0 in step S29 each time when the power of the printer 14 is turned on. Then, the second program 34 of the printer 14 determines whether the transmission timing stored in advance in the memory 32 has come (step S35). The transmission timing is set as an interval of several seconds to tens of seconds such as an interval of 10 seconds, an interval of 15 seconds, an interval of 20 seconds, and the like, for example.

When it is determined that the transmission timing has come (step S35: Yes), the second program 34 of the printer 14 transmits an HTTP request including a GUID thereof to the external mediation apparatus 12 (step S36).

The first program 24 of the external mediation apparatus 12 receives the HTTP request transmitted from the printer 14 (step S36). The first program 24 determines whether the GUID included in the received HTTP request coincides with the GUID decided in step S33 (step S37). That is, the first program 24 determines whether the printer 14 that transmits the HTTP request is the printer 14 to which the second instruction command generated in step S34 is to be transmitted.

When it is determined that the GUID included in the HTTP request received in step S36 does not coincide with the GUID decided in step S33 (step S37: No), the first program 24 of the external mediation apparatus 12 transmits an HTTP response that does not include a second instruction command (step S38). The HTTP response transmitted in step S38 indicates only that the HTTP request transmitted in step S36 is received.

On the other hand, when it is determined that the GUID included in the HTTP request received in step S36 coincides with the GUID decided in step S33 (step S37: Yes), the first program 24 of the external mediation apparatus 12 transmits an HTTP response that includes a second instruction command (step S39). That is, the external mediation apparatus 12 includes the second instruction command in the HTTP response to the HTTP request from the printer 14, and transmits the second instruction command to the printer 14 via the firewall.

The second program 34 of the printer 14 receives the HTTP response transmitted from the external mediation apparatus 12 (step S38, step S39). The second program 34 determines whether a second instruction command is included in the received HTTP response (step S40). When it is determined that the second instruction command is not included in the received HTTP response (step S40: No), the second program 34 returns to step S35 and continues to periodically transmit the HTTP request.

Although not shown in the flowchart, in a case where the second instruction command received in step S39 is a command indicating download of a file, the second program 34 of the printer 14 transmits an HTTP request, which includes a request for transmission of a file, to the external mediation apparatus 12. The first program 24 of the external mediation apparatus 12 that receives the HTTP request transmits an HTTP response including a file to the printer 14, in response to a command included in the HTTP request. The second program 34 of the printer 14 receives the file included in the HTTP response. Note that, the file may also be transmitted with being included in the second instruction command. In this case, the request for transmission of a file is not transmitted from the second program 34 to the first program 24.

Note that, the second program 34 of the printer 14 may determine whether an instruction indicated by the second instruction command received in step S39 is a change of setting information, an update of the firm version or an acquisition of the status information (which corresponds to a case to be described later), based on a status request flag attached to the second instruction command. For example, in a case where the first instruction command received in step S31 is an instruction to request the status information, the first program 24 of the external mediation apparatus 12 attaches a status request flag set to "ON" to the second instruction command.

On the other hand, when it is determined that the second instruction command is included in the received HTTP response (step S40: Yes), the second program 34 of the printer 14 transmits an HTTP request including a notification (hereinbelow, also referred to as "reception notification") indicting that the second instruction command is received to the external mediation apparatus 12 (step S41). That is, the second program 34 notifies the external mediation apparatus 12 that the second instruction command is received. This notification has following meanings.

That is, although not shown in the flowchart, when it is determined that the HTTP request including the reception notification is not received within a predetermined time, the first program 24 retransmits the second instruction command to the printer 14, as an HTTP response to the HTTP request that is periodically transmitted from the printer 14. Then, in a case where the HTTP request including the reception notification is received, the first program 24 returns an HTTP response, which indicates that the reception notification is received, to the printer 14.

That is, unless the reception notification is received, the second program 34 of the printer 14 cannot determine whether the printer 14 has received the second instruction command, until a response (refer to step S55 and S62, which will be described later) corresponding to the second instruction command is received. As a result, a time until a response corresponding to the second instruction command is received exceeds a predetermined time defined as a time until the second instruction command is retransmitted, so that even though the printer 14 has received the second instruction command, the external mediation apparatus 12 may retransmit the second instruction command. Therefore, the second program 34 of the printer 14 transmits the reception notification to the external mediation apparatus 12 (step S41) before transmitting a response (step S55 and S62) corresponding to the second instruction command. Thereby, it is possible to prevent a situation where even though the printer 14 has received the second instruction command, the external mediation apparatus 12 retransmits the second instruction command. The first program 24 of the external mediation apparatus 12 receives the HTTP request including the reception notification (step S41).

After executing the processing of step S41, the second program 34 of the printer 14 executes an instruction indicated by the second instruction command (step S52). For example, in a case where the second instruction command is an instruction to change the setting of the printer 14 with respect to each item of "font", "font size", "concentration" and the like of the setting information (FIG. 2), the second program 34 changes the setting values of "font". "font size", "concentration" and the like to setting values included in the second instruction command. Also, in a case where the second instruction command is an instruction to update the firm version, the second program 34 updates the second program 34 itself by a program included in the second instruction command.

Then, the second program 34 of the printer 14 determines whether the second program 34 itself executed the instruction indicated by the second instruction command (step S54).

In a case where it is determined that the instruction indicated by the second instruction command is not executed (step S54: No), the second program 34 transmits an HTTP request including first error information to the external mediation apparatus 12 (step S55). Note that, the HTTP request transmitted at this time may be an HTTP request that is periodically transmitted from the printer 14 to the external mediation apparatus 12 or may be an HTTP request that is transmitted separately from the HTTP request periodically transmitted.

In the meantime, although not shown in FIG. 2, in the data storage area 49 of the memory 42 of the printer 14, a first error correspondence list showing a correspondence between the first error code and a content of an error is stored. The second program 34 of the printer 14 decides a first error code corresponding to a content of an error from the first error correspondence list, generates first error information including the decided first error code and the device ID and transmits an HTTP request including the generated first error information (step S55).

The transmitted first error information is received by the external mediation apparatus 12 (step S55). The first program 24 of the external mediation apparatus 12 generates second error information, based on the received first error information (step S56). The second error information includes a second error code having a format that can be recognized by the management server 11. Although not shown in FIG. 2, in the data storage area 29 of the memory 22 of the external mediation apparatus 12, a second error correspondence list showing a correspondence between the first error code and the second error code is stored. The first program 24 decides a second error code corresponding to the first error code from the second error correspondence list, and generates second error information including the decided second error code and the device ID included in the first error information (step S56).

The first program 24 of the external mediation apparatus 12 transmits the second error information generated in step S56 to the management server 11, as a response to the received first instruction command (step S31) (step S57). The transmitted second error information is received by the management server 11 (step S57). When the second error information is received, the management server 11 transmits a reception response indicating that the second error information is received. The transmitted reception response is received by the external mediation apparatus 12 (step S58).

On the other hand, in a case where it is determined in step S54 that the printer 14 has executed the content instructed by the second instruction command (step S54: Yes), the second program 34 of the printer 14 stands by until the transmission timing at which the HTP request is periodically transmitted comes (step S61: No). When it is determined that the transmission timing has come (step S61: Yes), the second program 34 transmits an HTTP request including the status information after executing the content instructed by the second instruction command in step S52 to the external mediation apparatus 12, as a response to the second instruction command received in step S39 (step S62). At this time, the status information is the setting information, the firm version and the like. Although not shown in the flowchart, after receiving the HTTP request including the status information (step S62), the first program 24 of the external mediation apparatus 12 transmits information, which indicates that the HTTP request is received, to the printer 14, as an HTTP response to the HTTP request.

The status information is included in the HTTP request that is periodically transmitted from the printer 14 to the external mediation apparatus 12, as described above, so that it is possible to reduce the number of communication times between the printer 14 and the external mediation apparatus 12, as compared to a case where the status information is transmitted separately from the HTTP request that is periodically transmitted. Note that, the second program 34 may include the status information after change in an HTTP request separate from the HTTP request that is periodically transmitted, and may transmit the HTTP request to the external mediation apparatus 12. In this case, as compared to a case where the status information is included in the HTTP request that is periodically transmitted, it is possible to transmit more rapidly the status information to the external mediation apparatus 12.

The first program 24 of the external mediation apparatus 12 receives the status information after change, as a response to the second instruction command (step S62). When the status information is received, the first program 24 overwrites the values of the setting information, the firm version and the like of the correspondence database (FIG. 2) with the received status information (step S63).

Then, the first program 24 of the external mediation apparatus 12 generates setting completion information, which includes information indicating that the instruction indicated by the first instruction command is executed by the printer 14 and the status information received in step S62. Then, the first program 24 transmits the generated setting completion information to the management server 11, as a response to the first instruction command received in step S31 (step S64). The setting completion information is, for example, a command that can be input to the management server 11 and has the status information as ancillary information. Note that, the first program 24 of the external mediation apparatus 12 may transmit the status information received in S62 to the management server 11, separately from the setting completion information. That is, the information indicating that the setting is made, and the status information after setting may be separately transmitted to the management server 11.

When the setting completion information is received via the Internet 15 (step S64), the management server 11 transmits a reception response, which indicates that the setting completion information is received, to the external mediation apparatus 12 (step S65). The first program 24 of the external mediation apparatus 12 receives the reception response transmitted from the management server 11 (step S65), and ends the processing.

<Periodic Status Reporting without Instruction from Management Server>

In the above, the processing that is executed by the first program 24 of the external mediation apparatus 12 and the second program 34 of the printer 14 according to the first instruction command from the management server 11 has been described. In the below, processing in which the first program 24 of the external mediation apparatus 12 and the second program 34 of the printer 14 periodically transmit the status information of the printer 14 irrespective of an instruction from the management server 11 is described with reference to FIG. 6.

Figure 6A:
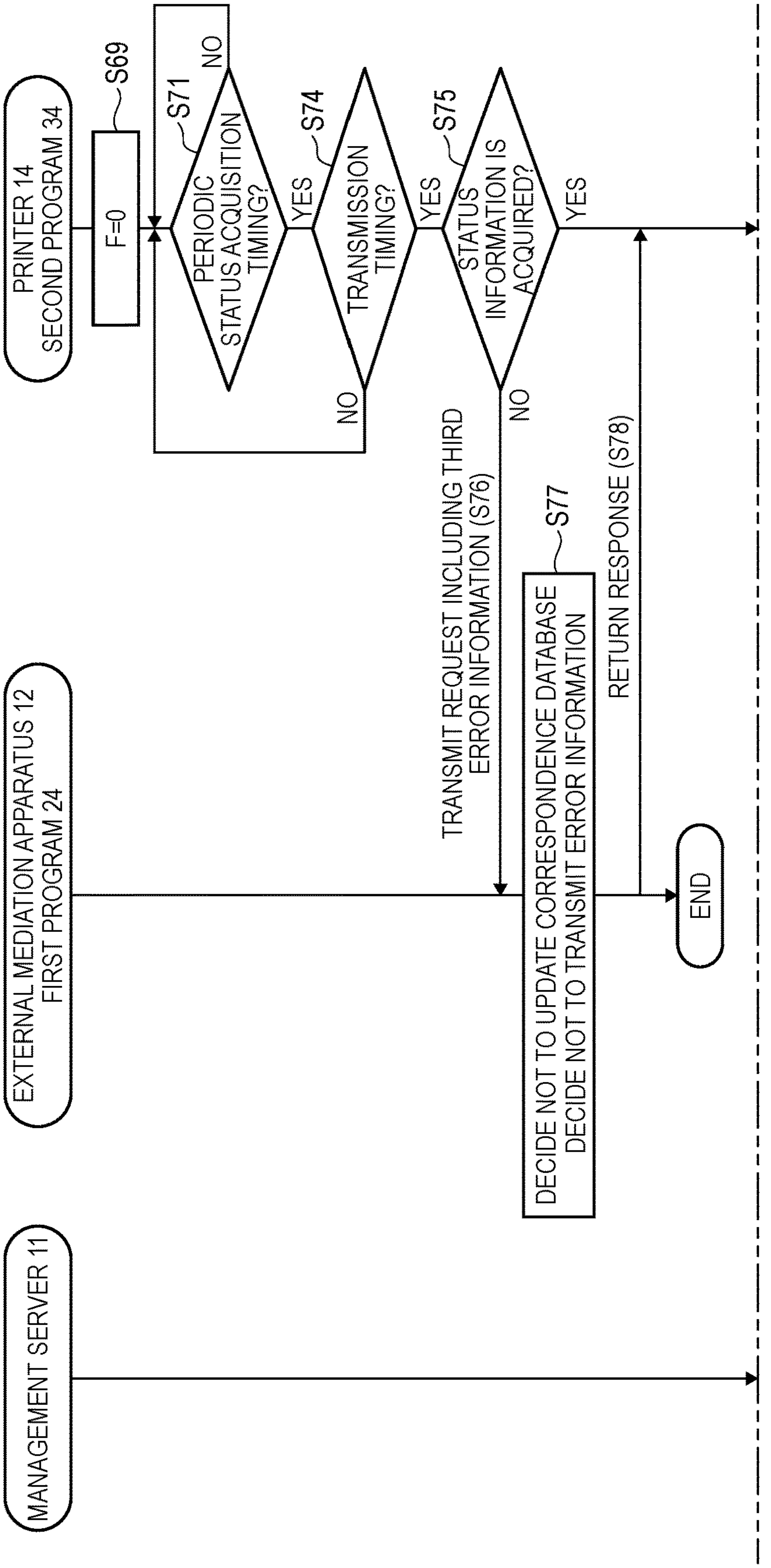
FIGS. 6A and 6B depict processing that is executed in the management server, the external mediation apparatus, and the printer when periodically reporting a status without an instruction from the management server.
Figure 6B:
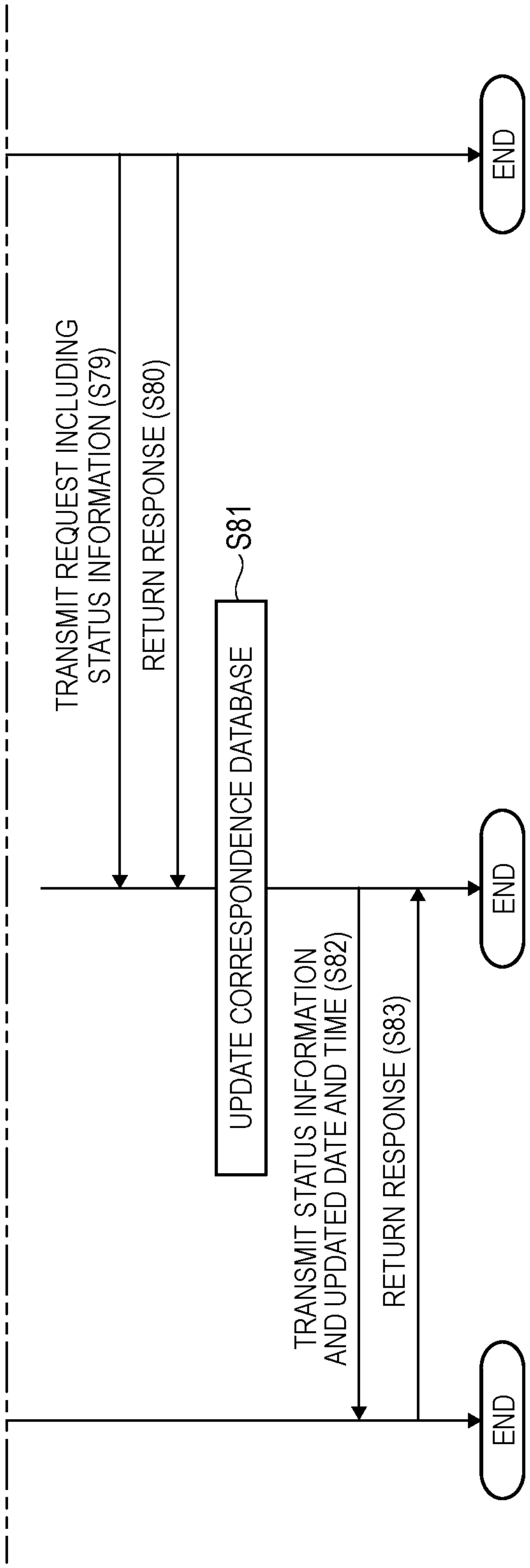

First, the second program 34 of the printer 14 initializes the time information acquisition flag F to 0 (step S69). However, in a case where the processing is executed continuously from the flowchart of FIG. 3 or 4, the processing of step S69 is skipped. That is, the flowchart of FIGS. 6A and 6B is executed each time when the power of the printer 14 is turned on, except the case where the processing is executed continuously from the flowchart of FIG. 3 or 4. Therefore, the time information acquisition flag F is initialized to 0 in step S69 each time when the power of the printer 14 is turned on. Then, the second program 34 of the printer 14 stands by until it comes to a periodic status acquisition timing (step S71: No). The periodic status acquisition timing is every one hour, every 12 hours, every 24 hours, and the like, for example. That is, the periodic status acquisition timing is set to be longer than the transmission timing of periodically transmitting the HTTP request. The reason is described. When the printer 14 is caused to execute processing of returning the status information, power is consumed in the printer 14. Therefore, in a case where the periodic status acquisition timing is set to a timing of a second unit or a minute unit, consumption of the battery 50 increases. However, when the periodic status acquisition timing is set to an hour unit such as one hour, 12 hours, 24 hours or the like, the consumption of the battery 50 can be suppressed.

Also, setting the periodic status acquisition timing to an hour unit has other meanings, as follows. That is, although not shown in FIG. 1, the printer 14 includes a power supply circuit configured to drive the print engine 51 and to charge the battery 50. The power supply circuit is configured to convert and output a commercial input AC voltage into a DC voltage. The second program 34 of the printer 14 has a function of executing so-called sleep processing of stopping driving of the power supply circuit. When the periodic status acquisition timing is set to an hour unit such as one hour, 12 hours, 24 hours or the like, the printer 14 that is put into a dormant state by the sleep function can be suppressed from frequently returning to a state where a drive circuit outputs a DC voltage. As a result, the consumption of the battery 50 is suppressed, and discomfort of a user of a printer can be suppressed. The discomfort of the user of the printer 14 means that even though the printer 14 is put into the dormant state, the dormant state soon returns to the drive state.

When it is determined that the periodic status acquisition timing has come (step S71: Yes), the second program 34 of the printer 14 determines whether a transmission timing of transmitting an HTTP request to the external mediation apparatus has come 12 (step S74). When it is determined that the transmission timing has not come (step S74: No), the second program 34 again executes the processing of step S71. On the other hand, when it is determined that the transmission timing has come (step S74: Yes), the second program 34 determines whether the status information to be periodically acquired is acquired from each unit in the printer 14 (step S75).

When it is determined that the status information is not acquired (step S75: No), the second program 34 of the printer 14 generates third error information indicating that the status information is not acquired, and transmits an HTTP request including the generated third error information to the external mediation apparatus 12 (step S76). Note that, the HTTP request including the third error information may also be included in an HTTP request separate from the HTTP request that is periodically transmitted. That is, in a case where it is determined that the status information is not acquired, the second program 34 may transmit the HTTP request including the third error information to the external mediation apparatus 12 without waiting for the transmission timing. When the HTTP request including the third error information is received (step S76), the first program 24 transmits a response, which indicates that the HTTP request is received, to the printer 14 (step S78).

Also, when the HTTP request including the third error information is received (step S76), the first program 24 of the external mediation apparatus 12 decides not to update the correspondence database, and also decides not to transmit information corresponding to the third error information to the management server 11 (step S77). That is, in a case where the printer 14 does not execute an instruction corresponding to the first instruction command input from the management server 11, the first program 24 generates and transmits the second error information to the management server 11, as described above. On the other hand, in a case where the status information tried to be periodically acquired cannot be acquired, the first program 24 does not transmit the third error information to the management server 11. Thereby, the error information is suppressed from being frequently transmitted to the management server 11.

On the other hand, when it is determined in step S75 that the status information is acquired (step S75: No), the second program 34 of the printer 14 transmits an HTTP request including the status information to the external mediation apparatus 12 (step S79). Note that, the HTTP request including the status information may also be included in an HTTP request separate from the HTTP request that is periodically transmitted. That is, when it is determined that the status information is received, the second program 34 may transmit the HTTP request including the status information to the external mediation apparatus 12 without waiting for the transmission timing.

When the HTTP request including the status information transmitted from the printer 14 is received (step S79), the first program 24 of the external mediation apparatus 12 transmits an HTTP response, which indicates that the HTTP request is received, to the printer 14 (step S80).

Also, when the HTTP request including the status information is received (step S79), the first program 24 of the external mediation apparatus 12 updates the items of the correspondence database with the received status information (step S81). Also, the first program 24 updates the item "update date and time" of the correspondence database with date and time at which the HTTP request including the status information is received. Thereby, the administrator of the external mediation apparatus 12 can check the item "update date and time" and recognize date and time at which the status information is updated and the latest date and time at which communication with the printer 14 could be performed by displaying the correspondence database on the display of the external mediation apparatus 12.

Then, the first program 24 of the external mediation apparatus 12 transmits a command having the updated status information and update date and time as ancillary information to the management server 11 (step S82). When the command having the status information and update date and time as ancillary information is received (step S82), the management server 11 stores the received status information and update date and time in the memory (not shown), and transmits a response, which indicates that the status information and update date and time are received, to the external mediation apparatus 12 (step S83). Therefore, the administrator can check the latest date and time at which the status information is received by displaying, on the display of the external mediation apparatus 12, the information stored in the management server 11 with the browser or displaying, on the display, the correspondence database stored in the memory 22 of the external mediation apparatus 12.

<Status Reporting by Instruction from Management Server>

That is, a case is described in which the instruction to the printer 14 by the first instruction command transmitted by the management server 11 is an instruction to request transmission of the status information of the printer 14. In this case, the first program 24 of the external mediation apparatus 12 transmits the status information that is periodically acquired to the management server 11, as a response to the first instruction command. An example is described with reference to FIGS. 4, 6A and 6B.

That is, in FIG. 4, when a second instruction command to request that the status information of the printer 14 should be returned is received from the external mediation apparatus 12 (step S39), the second program 34 of the printer 14 transmits an HTTP request, which includes a notification indicating that the second instruction command is received, to the external mediation apparatus 12 (step S41). Then, shifting to FIG. 6A, the second program 34 stands by until the periodic status acquisition timing has come (step S71: No).

When it is determined that the periodic status acquisition timing has come (step S71: Yes), the second program 34 of the printer 14 determines whether the transmission timing of transmitting the HTTP request to the external mediation apparatus 12 has come, similar to the above. When it is determined that the transmission timing has come (step S74: Yes), the second program 34 transmits an HTTP request including the status information acquired from each unit in the printer 14 to the external mediation apparatus 12, as a response to the second instruction command (step S75, S79).

After receiving the HTTP request including the status information and returning the HTTP response (step S80), the first program 24 of the external mediation apparatus 12 updates the correspondence database with the received status information (step S81), and transmits the status information to the management server 11, as a response to the first instruction command (step S82).

The management server 11 receives the status information (step S82), as a response to the transmitted first instruction command, and transmits a response, which indicates that the status information is received, to the external mediation apparatus 12 via the Internet 15 (step S83).

The first program 24 of the external mediation apparatus 12 receives the response indicating that the status information is received (step S83), and ends the processing.

<Acquisition of Time Information>

In the above basic configurations and operations, as described above, the communication between the printer 14 and the external mediation apparatus 12 is performed in such a manner that the printer 14 transmits the HTTP request to the external mediation apparatus 12 and the external mediation apparatus 12 transmits the HTTP response to the HTTP request with including diverse information including an instruction. In this case, the printer 14 performs communication with the external mediation apparatus 12 in an encrypted mutual recognition wireless communication manner. In order to perform the communication, it is necessary to verify mutual electronic certificates. Usually, since a period of validity is set for the electronic certificate, it is necessary for the printer 14 to acquire time information in advance so as to verify the electronic certificates.

Figure 7:
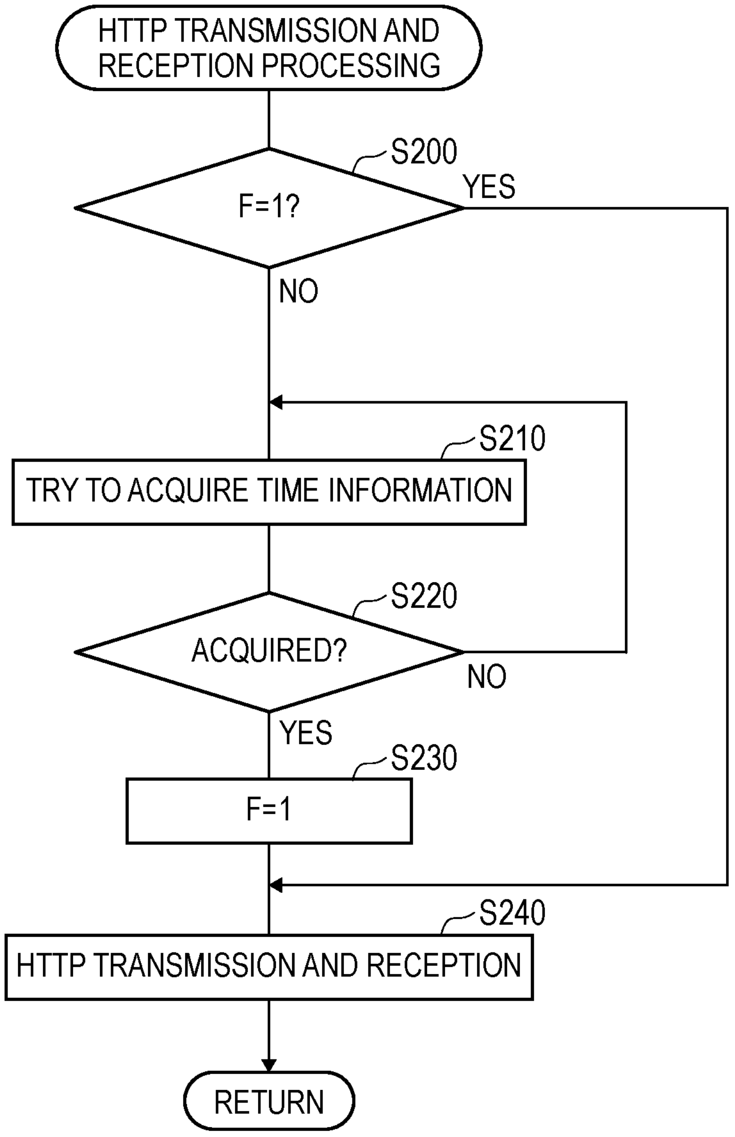
FIG. 7 is a flowchart depicting processing of information transmission and reception including time information acquisition, which is executed by a second program of the printer when executing the information transmission and reception with respect to the external mediation apparatus.

In the present embodiment, in order to cope with the above situations, the printer 14 acquires time information from the NTP server 1, which is an external apparatus outside the apparatus, via the Internet 15 before information transmission and reception with respect to the external mediation apparatus 12. The NTP server 1 is an example of the time information server. In the below, the processing of the information transmission and reception including the time information acquisition is described with reference to FIG. 7. Note that, the processing shown in FIG. 7 is executed by the second program 34 of the printer 14 each time when the information transmission and reception is executed between the external mediation apparatus 12 and the printer 14 in FIGS. 4 to 6B. That is, the processing of FIG. 7 is executed in step S14 and step S22 of FIG. 3, step S36, step S38, step S39 and step S41 of FIG. 4, step S55 and step S62 of FIG. 5, and step S76, step S78, step S79 and step S80 of FIGS. 6A and 6B, for example.

In FIG. 7, the second program 34 of the printer 14 first determines whether the time information acquisition flag F is 1 (step S200). When it is determined that the time information acquisition flag F is 0 (step S220: No), the second program 34 tries to acquire the time information from the NTP server 1 via the Internet 15 (step S210). The processing that is executed in step S210 is an example of the trying to acquire the time information.

Then, the second program 34 of the printer 14 determines whether the time information is acquired from the NTP server 1 (step S220). The processing that is executed in step S220 is an example of the determining of whether the time information has been successfully acquired. While the time information is not acquired from the NTP server 1 (step S220: No), the second program 34 of the printer 14 repeats step S210, and when it is determined that the time information is acquired from the NTP server 1 (step S220: Yes), the second program 34 sets the time information acquisition flag F to 1 (step S230).

Then, the second program 34 of the printer 14 executes information transmission and reception with respect to the external mediation apparatus 12 by using the above-described HTTP request and HTTP response (step S240). On the other hand, in a case where it is determined in step S20 that the time information acquisition flag F is 1 (step S200: Yes), the second program 34 of the printer 14 executes information transmission and reception with respect to the external mediation apparatus 12 in step S240 without executing step S210, step S220 and step S230.

That is, while the time information is not acquired from the NTP server 1 in step S210, step S240 is not executed, and when it is determined that the time information is acquired from the NTP server 1 in step S210 (step S220: Yes), step S240 is executed, and also, step S240 is executed even when the time information was already acquired in the past and the time information acquisition flag F is 1. As a result of the flow of the processing, the processing that is executed in step S240 is an example of the information transmission and reception. Then, the second program 34 of the printer 14 ends the flow.

Effects of Embodiment

As described above, in the present embodiment, the second program 34 of the printer 14 first tries to acquire the time information (step S210), and then determines whether the time information has been successfully acquired (step S220). Only in a case where it is determined that the time information has been successfully acquired (step S220: Yes), the second program 34 performs the information transmission and reception with respect to the external mediation apparatus 12 by the mutual recognition communication, in the above example, the HTTPS communication (step S240), and in a case where it is not determined that the time information has been successfully acquired (step S220: No), the second program 34 does not perform the information transmission and reception. Thereby, the communication with the external mediation apparatus 12 is always performed after the time information is acquired, and a situation where the above-described verification error continuously occurs without the time information is prevented. As a result, it is possible to avoid adverse effects of an increase in communication traffic between the printer 14 and the external mediation apparatus 12 and an increase in consumption of the battery in the printer 14, so that it is possible to improve usability for a user.

Also, in the present embodiment, in particular, the time information is acquired from an outside of the printer 14. Thereby, even though the printer 14 does not have therein a function of generating the time information, it is possible to perform smooth communication with the external mediation apparatus 12 by using the time information acquired from the outside.

Also, in the present embodiment, in particular, the time information acquired from the time information distribution server, in the above example, the NTP server 1 is used. Thereby, it is possible to perform smooth communication with the external mediation apparatus 12.

Also, in the present embodiment, in particular, the time information is acquired each time when the power of the printer 14 is turned on. Thereby, even in a case where the power of the printer 14 becomes off and the time information is lost, it is possible to securely acquire the time information when the power is turned on thereafter, and to verify the electronic certificates.

The present disclosure is not limited to the above embodiment and can be diversely modified without departing from the gist and technical spirit thereof. In the below, modified embodiments are described. The parts equivalent to the above embodiment are denoted with the same reference signs, and the descriptions thereof are omitted or simplified as appropriate.

(1) Manual Input of Time Information

That is, instead of using the time information input from the NTP server 1, as described above, in the present modified embodiment, the user inputs an appropriate time by a manual operation on an appropriate operation unit provided on the printer 14. In this case, in step S210 of FIG. 7, the time information corresponding to the time input by the manual input is tried to be acquired, and it is determined in step S220 whether the time information has been successfully acquired.

In the present modified embodiment, as described above, the user inputs the time by operating the operation unit, so that the time information corresponding to the time is acquired by the second program 34. Note that, since the accuracy of the time information is not problematic for avoiding the verification error of the electronic certificates and the time indicated by the time information may be any time as long as the time is within the period of validity of the electronic certificate to be verified, there is no problem in the above-described operation input. Thereby, similar to the embodiment, even when the printer 14 is not provided with the function of generating the time information, it is possible to perform smooth communication with the external mediation apparatus 12 by using the time information corresponding to the time input as described above.

(2) Case Where Time Information Is Acquired From Another Printer

As shown in FIG. 1, the management system 10 includes a plurality of local networks 16, and a plurality of printers 14 is provided in each of the local networks 16. The printers 14 connected to the local network 16 can perform communication with each other by using a communication protocol such as TCP/IP. Therefore, for example, in a case where a specific printer 14 has acquired the time information from the NTP server 1, another printer 14 in the same local network 6 may acquire the time information from the specific printer 14. The same holds true for a case where the specific printer 14 has already acquired the time information based on the user's manual operation. Note that, in this case, another printer 14 is an example of the printing apparatus, and the specific printer 14 is an example of the first printing apparatus.

In the present modified embodiment, in step S210 of FIG. 7 that is executed by the second program 34 of another printer 14, it is tried to acquire the time information from the specific printer 14, and it is determined in step S220 whether it is successful to acquire the time information.

In the present modified embodiment, in a case where the specific printer 14 configured to perform communication with the external mediation apparatus 12 has already acquired the time information, the second program 34 of another printer 14 uses the time information acquired from the specific printer 14. Thereby, as compared to a case where another printer 14 acquires the time information from the NTP server 1 or the like in a separate independent manner, it is possible to acquire the time information in a simpler control while reducing the communication traffic in the entire network, so that it is possible to perform smooth communication with the external mediation apparatus 12.

(3) Case Where Auto Power-Off Function Is Provided in the present modified embodiment, the printer 14 has a so-called auto power-off function. That is, for example, in response to a predetermined reference time having elapsed since a specific operation mechanism such as the print engine 51, the communication I/F 45 and the like is put into a non-operating state, the printer 14 is switched to a power supply-off state. The auto power-off function by the second program 34 is described with reference to a flowchart shown in FIG. 8. Note that, the processing shown in FIG. 8 is executed by the second program 34 of the printer 14 in parallel with and separately from the processing shown in FIGS. 9 to 12, which will be described later.

Figure 8:
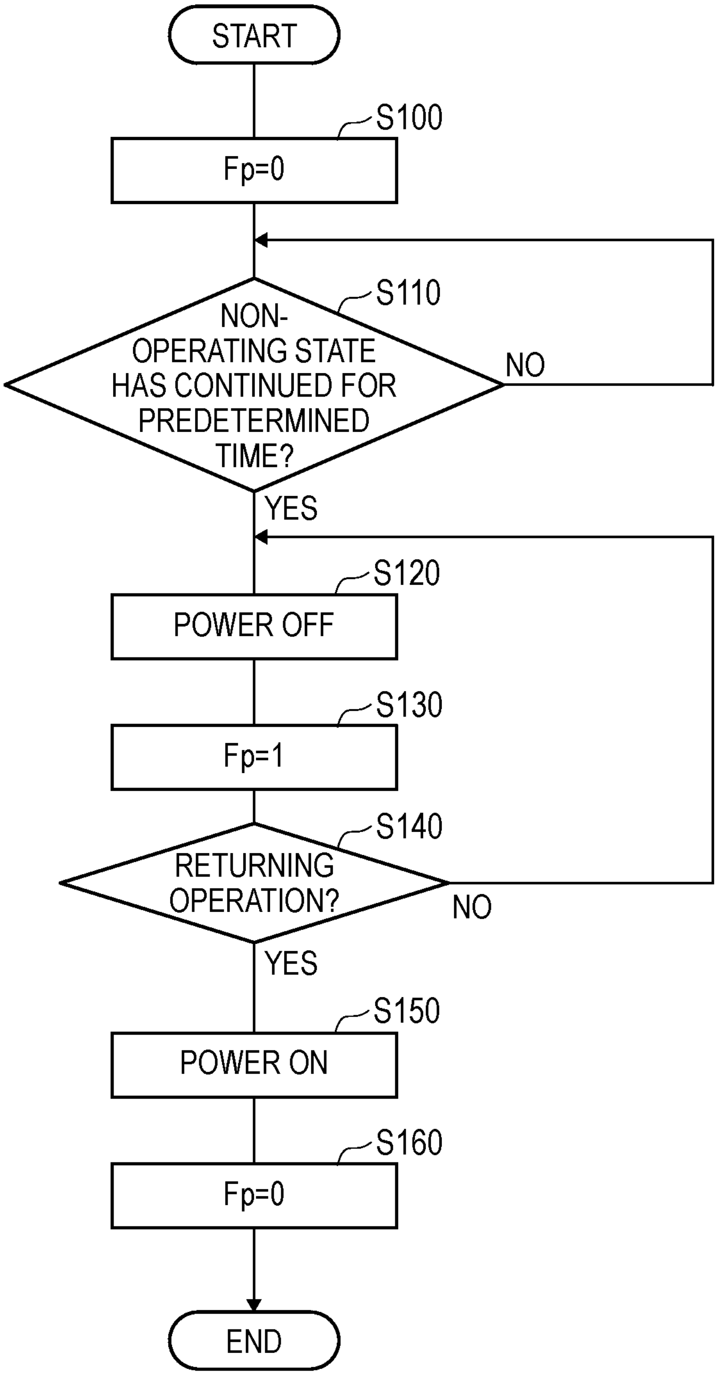
FIG. 8 is a flowchart depicting detailed procedures of an auto power-off function that is executed by the second program of the printer, in a modified embodiment having the auto power-off function.

In FIG. 8, the second program 34 of the printer 14 first initializes an execution flag Fp, which indicates whether or not to execute the auto power-off function, to 0 (step S100). Then, the second program 34 determines whether the non-operating state of the specific operation mechanism provided in the printer 14 has continued for a predetermined reference time (step S110). The specific operation mechanism is, for example, the print engine 51, the communication I/F 45 and the like. Also, in this example, the reference time is set to 10 minutes. When the non-operating state continues for 10 minutes (step S110: Yes), the second program 34 of the printer 14 turns off the power supply of the printer 14, i.e., switches a power supply voltage to a supply cutoff state (step S120), and sets the execution flag Fp to 1 (step S130). The processing that is executed in step S120 is an example of the switching of the power supply voltage.

Then, the second program 34 of the printer 14 determines whether a predetermined returning operation for releasing the power supply-off state is performed (step S140). The returning operation is a predetermined appropriate operation on an appropriate operation unit such as a button provided on the printer 14, for example. The second program 34 continues the power supply-off state until the returning operation is performed (step S140: No). When it is determined that the returning operation is performed (step S40: Yes), the second program 34 turns on the power supply of the printer 14, i.e., returns the power supply voltage to a supply state (step S150), returns the execution flag Fp to 0 (step S160), and ends the processing. The processing that is executed in step S150 is an example of the returning of the power supply voltage.

In the present modified embodiment, the processing that is executed by the first program 24 and the second program 34 in correspondence to the processing of FIG. 8 is described with reference to FIG. 5 and FIGS. 9, 10, 1A, 1B and 12 corresponding to FIGS. 3, 4, 6A, 6B and 7.

Figure 3:
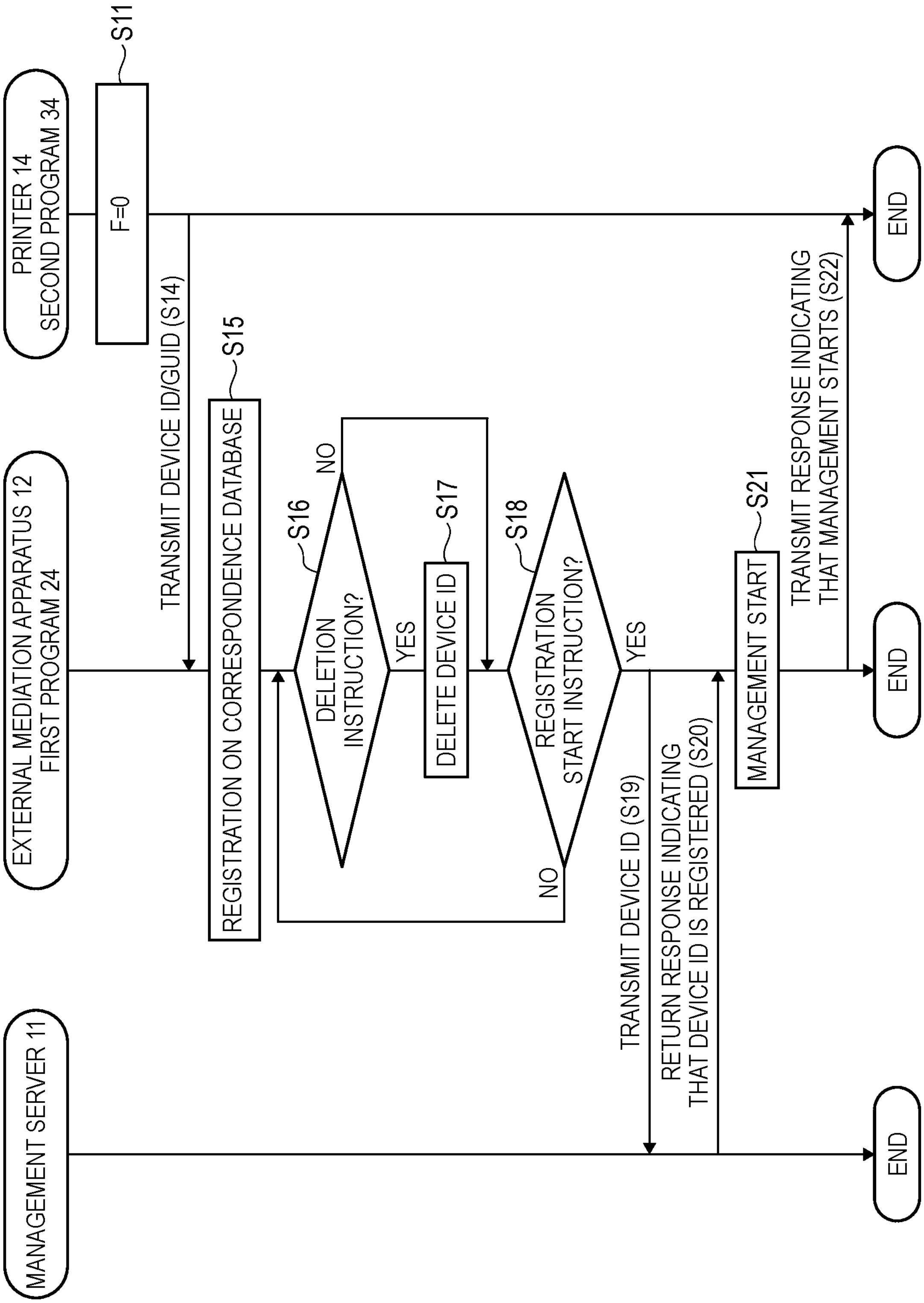
FIG. 3 depicts processing that is executed in the management server, an external mediation apparatus, and a printer when registering the printer on the management server.
Figure 4:
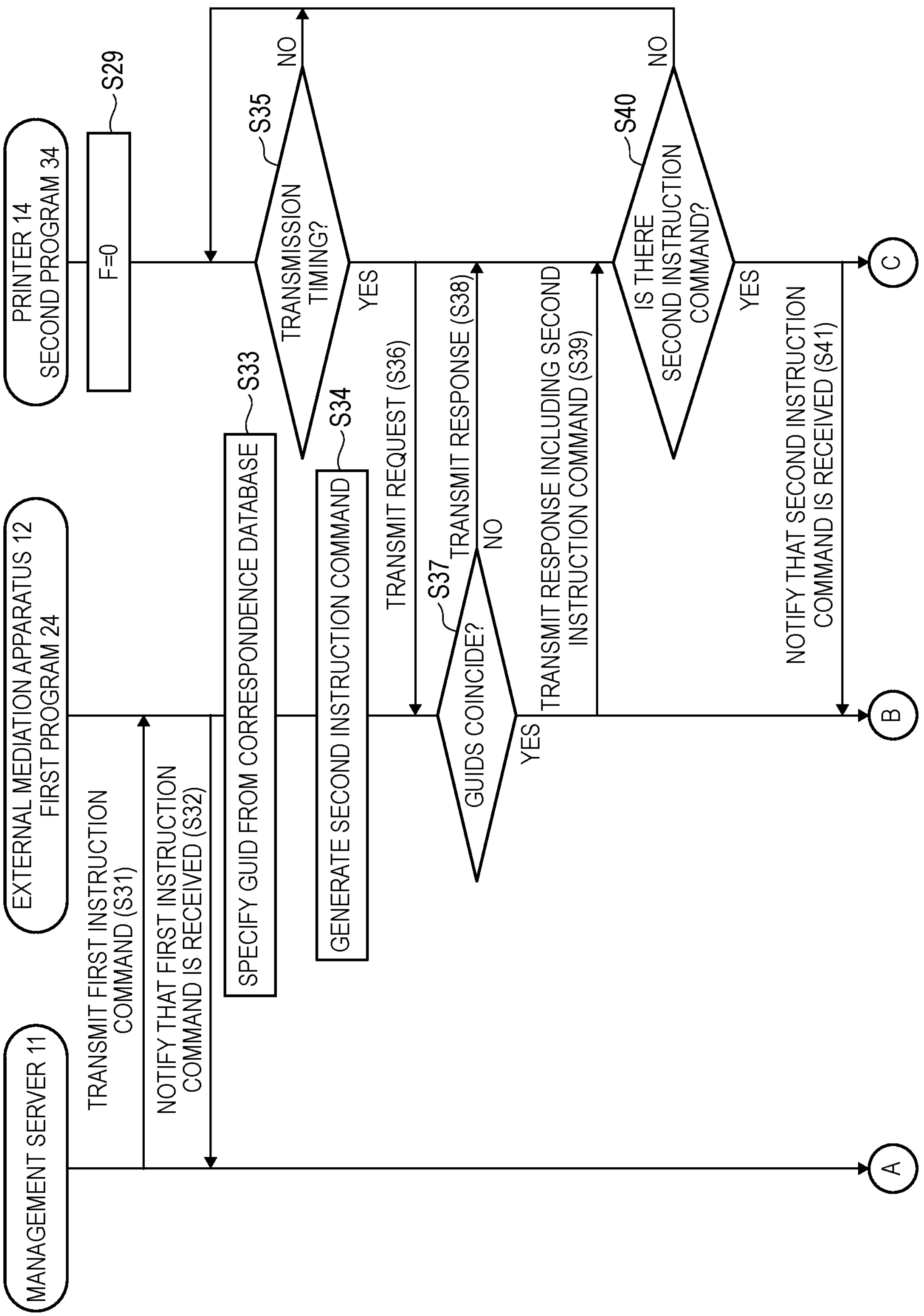
FIG. 4 depicts processing that is executed in the management server, the external mediation apparatus, and the printer when causing the printer to execute an instruction transmitted from the management server.
Figure 5:
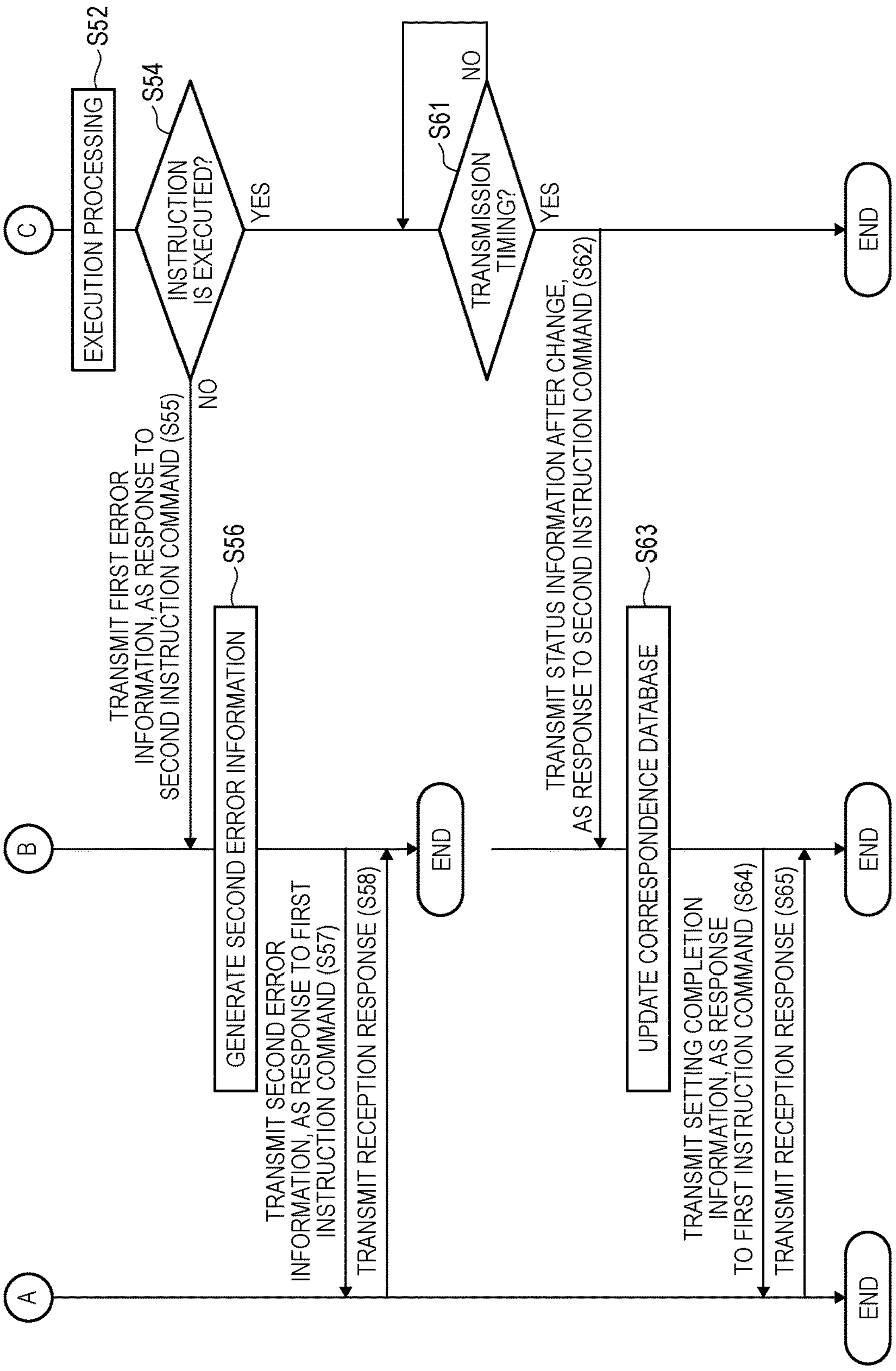
FIG. 5 depicts processing that is executed in the management server, the external mediation apparatus, and the printer when causing the printer to execute an instruction transmitted from the management server.
Figure 9:
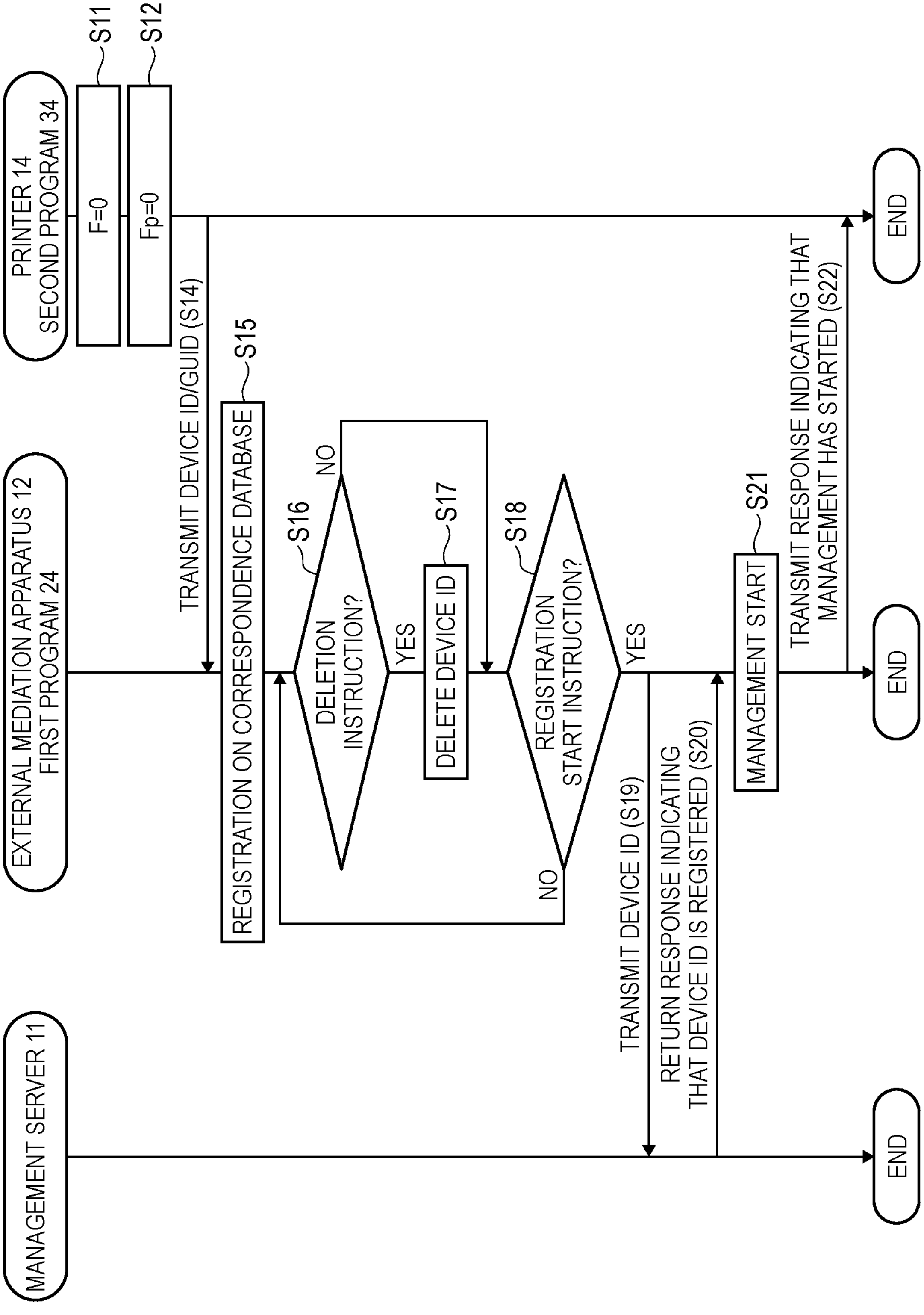
FIG. 9 depicts processing that is executed in the management server, the external mediation apparatus, and the printer when registering a printer on the management server.

That is, when registering the printer 14 on the correspondence database in FIG. 3, as shown in FIG. 9, the second program 34 initializes the time information acquisition flag F to 0 (step S11), and then initializes the execution flag Fp to 0 (step S12). The processing thereafter is similar to FIG. 3. Note that, the flowchart shown in FIG. 9 is executed each time when the power of the printer 14 is turned on. Therefore, the time information acquisition flag F and the execution flag Fp are initialized to 0 in step S1 and step S12 each time when the power is turned on.

Figure 10:
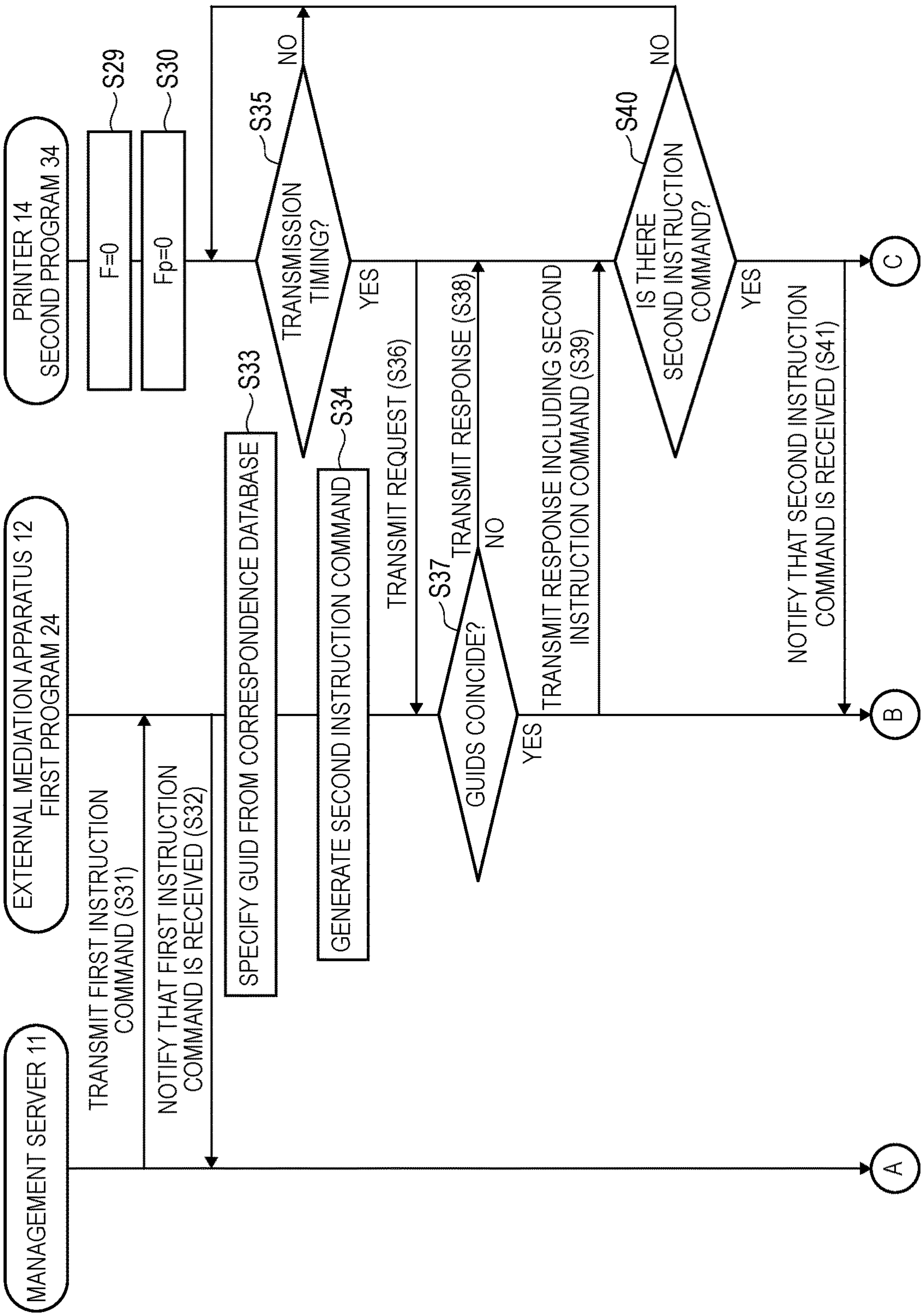
FIG. 10 depicts processing that is executed in the management server, the external mediation apparatus, and the printer when causing the printer to execute an instruction transmitted from the management server.

Also, when executing desired processing based on an instruction from the management server 11, as described above with reference to FIGS. 4 and 5, the second program 34 initializes the time information acquisition flag F to 0 (step S29), and then initializes the execution flag Fp to 0 (step S30), as shown in FIG. 10. In the meantime, similar to FIG. 4, when the processing is executed continuously from the flowchart of FIG. 9, step S29 and step S30 of FIG. 10 are skipped. That is, the flowchart shown in FIG. 10 is executed each time when the power of the printer 14 is turned on, except for a case where the processing is executed continuously from the flowchart of FIG. 9. Therefore, the time information acquisition flag F and the execution flag Fp are initialized to 0 in step S29 and step S30 each time when the power is turned on. The processing thereafter is similar to FIGS. 4 and 5.

Figure 11A:
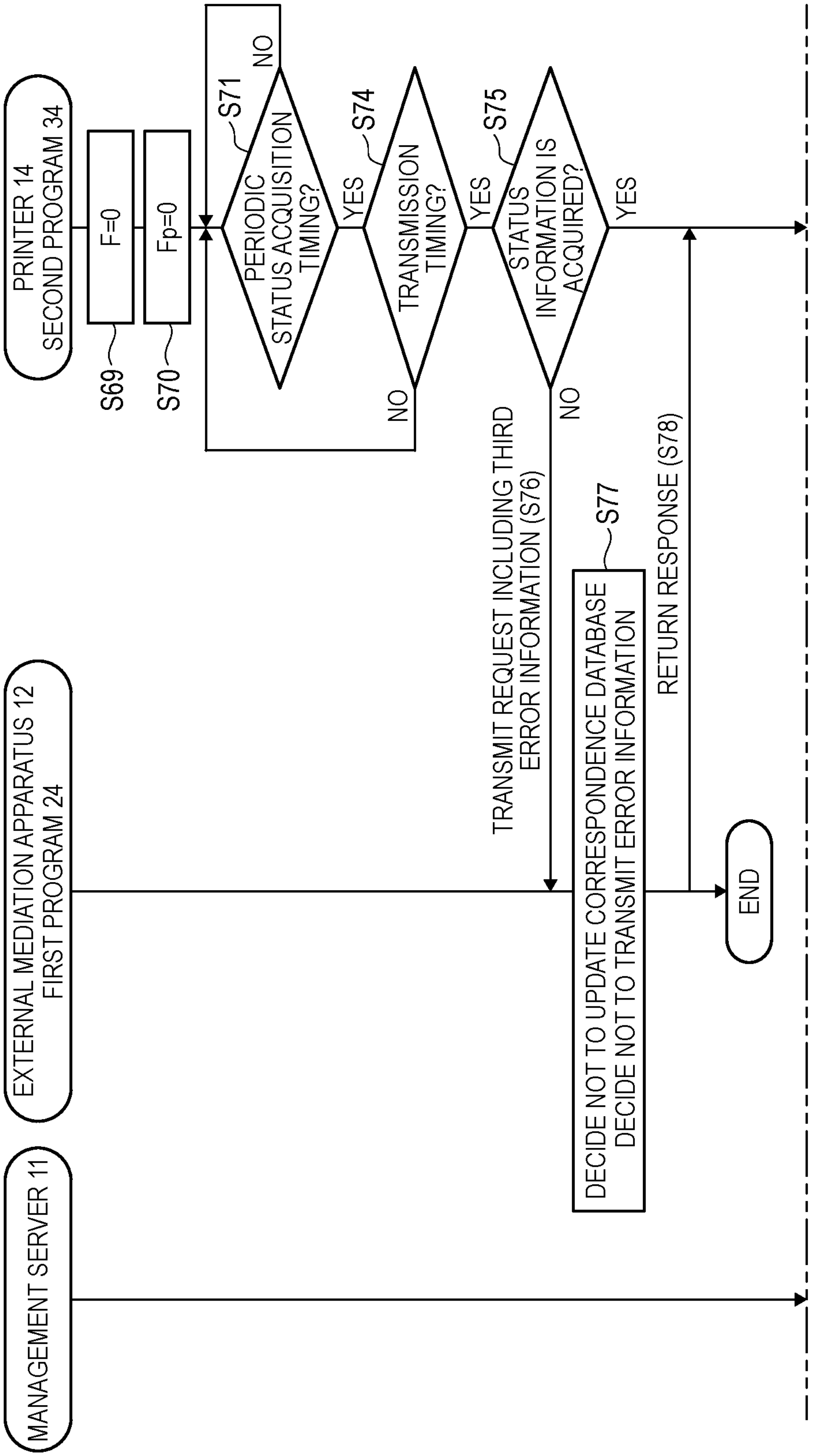
FIGS. 11A and 11B depict processing that is executed in the management server, the external mediation apparatus, and the printer when periodically reporting a status without an instruction from the management server.
Figure 11B:
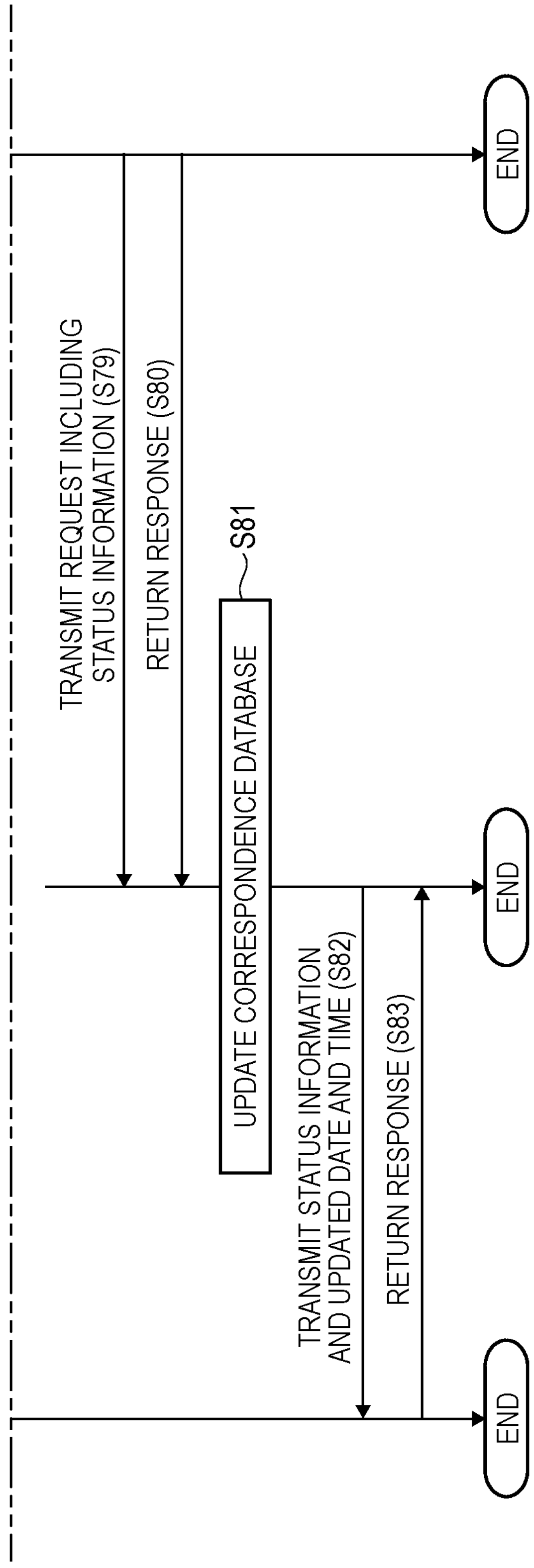

Also, when executing the processing of periodically transmitting the status information of the printer 14, irrespective of the instruction from the management server 11, as described above with reference to FIGS. 6 and 6B, the second program 34 initializes the time information acquisition flag F to 0 (step S69), and then initializes the execution flag Fp to 0 (step S70), as shown in FIG. 11. In the meantime, similar to FIG. 10, when the processing is executed continuously from the flowchart of FIG. 9, step S69 and step S70 of FIG. 11A are skipped. That is, the flowchart shown in FIG. 11A is executed each time when the power of the printer 14 is turned on, except for a case where the processing is executed continuously from the flowchart of FIG. 9. Therefore, the time information acquisition flag F and the execution flag Fp are initialized to 0 in step S69 and step S70 each time when the power us turned on. The processing thereafter is similar to FIG. 6A.

Figure 12:
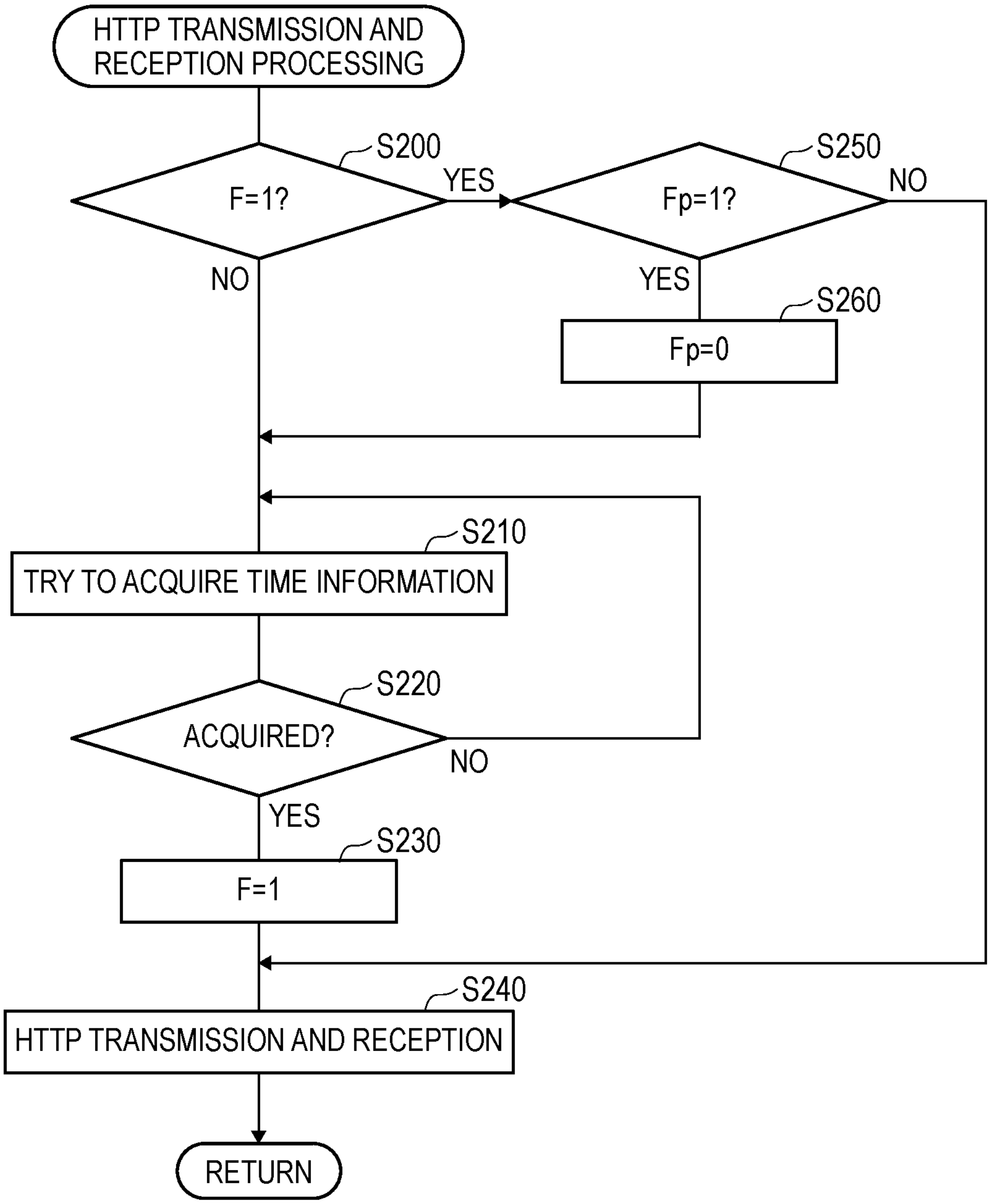
FIG. 12 is a flowchart depicting processing of information transmission and reception including time information acquisition, which is executed by the second program of the printer when executing the information transmission and reception with respect to the external mediation apparatus.

In the present modified embodiment, the processing of the information transmission and reception including the time information acquisition is shown in FIG. 12. Note that, the processing shown in FIG. 12 is executed by the second program 34 of the printer 14 each time when the information transmission and reception is executed between the external mediation apparatus 12 and the printer 14 in FIGS. 10, 11A and 11B, similar to FIG. 7.

In FIG. 12, in the present modified embodiment, the second program 34 of the printer 14 determines whether the time information acquisition flag F is 1 (step S200). In a case where it is determined that the time information acquisition flag F is 1 (step S200. Yes), the second program 34 determines whether the execution flag Fp is 1 (step S250). In a case where it is determined that the execution flag Fp is 0 (step S250: No), the second program 34 executes the information transmission and reception with respect to the external mediation apparatus 12 in step S240. On the other hand, in a case where it is determined that the execution flag Fp is 1 (step S250: Yes), the second program 34 sets the execution flag Fp to 1 (step S260), and then tries to acquire the time information from the NTP server 1 via the Internet 15 (step S210). Step S220 and step S230 thereafter are similar to FIG. 7.

In the present modified embodiment, the printer 14 is provided with the so-called auto power-off function, and even though the power supply is turned off by the auto power-off function (step S120) and the time information is thus lost, when the returning operation is thereafter performed and the power supply is again turned on (step S140), it is possible to securely acquire the time information, and to verify the electronic certificates.

(4) Case Where Internal Mediation Apparatus Is Provided

<System Configuration>

Figure 13:
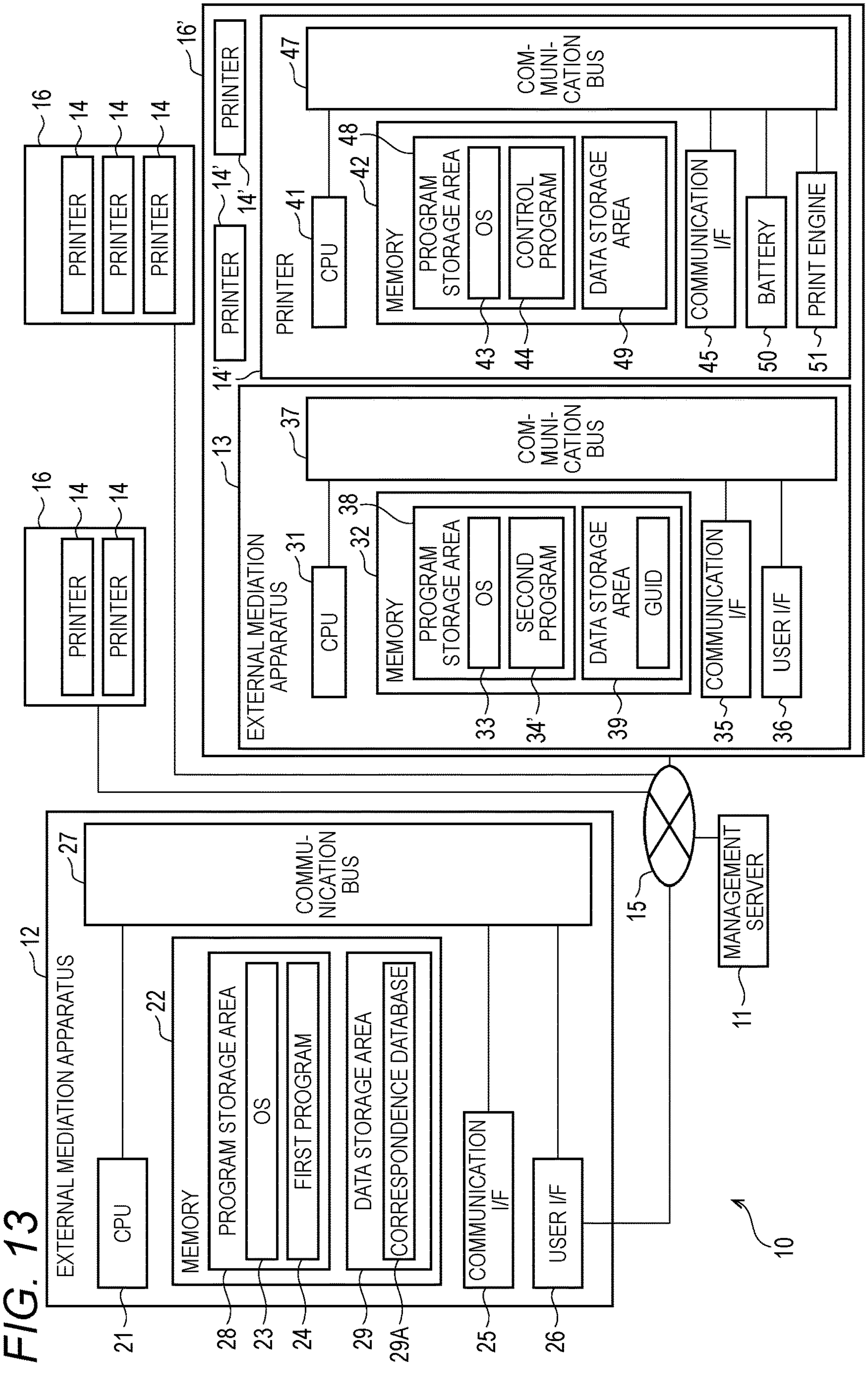
FIG. 13 is a schematic configuration view of a management system, in a modified embodiment where an internal mediation apparatus is provided.

In the present modified embodiment, for some printers 14' of a plurality of printers, in order to manage the same by the management server 11, an internal mediation apparatus 13 is used, in addition to the external mediation apparatus 12. That is, as shown in FIG. 13 corresponding to FIG. 1, the management system 10 includes the management server 11 and the external mediation apparatus 12 connected to the Internet 15, the printers 14 connected to the local networks 16 similar to the embodiment and the modified embodiments (1) to (3), and printers 14' and an internal mediation apparatus 13 connected to a local network 16'. Note that, in the present modified embodiment, the NTP server 1 is not provided.

The internal mediation apparatus 13 is, for example, a server or a personal computer equipped at each branch of the company. The internal mediation apparatus 13 and each printer 14' are connected to each other via the local network 16' established at the branch. The internal mediation apparatus 13 and the printer 14' connected to the local network 16' can perform communication with each other by using a communication protocol such as TCP/IP. Specifically, the internal mediation apparatus 13 and the printer 14' perform communication with each other by using private IP addresses or MAC addresses. The internal mediation apparatus 13 connected to the local network 16' performs communication with the external mediation apparatus 12 via a relay apparatus. Specifically, the internal mediation apparatus 13 and the external mediation apparatus 12 perform communication with each other via a firewall established by the relay apparatus. Note that, the firewall is not necessarily required. That is, in a case where the firewall is not necessary or is less necessary, the relay apparatus may not have the firewall.

In the management system 10, the printer 14' is managed by the external mediation apparatus 12 and the internal mediation apparatus 13 configured as described above. At this time, the internal mediation apparatus 13 is provided with a second program 34' having functions equivalent to the second program 34 provided in the printer 14 of the embodiment and the like. The printer 14' is managed using the first program 24 that is installed and executed in the external mediation apparatus 12 and the second program 34' that is installed and executed in the internal mediation apparatus 13.

<Internal Mediation Apparatus>

The internal mediation apparatus 13 includes a CPU 31, a memory 32, a communication I/F 35, a user I/F 36, and a communication bus 37. The configurations of the CPU 31, the memory 32, the communication I/F 35, the user I/F 36, and the communication bus 37 are similar to the configurations of the CPU 21, the memory 22, the user I/F 26, and the communication bus 27 of the external mediation apparatus 12.

The memory 32 has a program storage area 38 and a data storage area 39. In the program storage area 38, programs such as an OS 33 and a second program 34' are stored. In the data storage area 39, data necessary to execute the programs are stored. Also, in the data storage area 39, the GUID is stored.

The OS 33 is a basic program of the internal mediation apparatus 13. The second program 34' is a program for controlling communication with the external mediation apparatus 12 and the printer 14' via the communication I/F 35 in cooperation with the OS 33. The second program 34' may be a single program or a group of a plurality of programs.

The communication I/F 35 is an interface capable of performing communication with the external mediation apparatus 12 and the printer 14'. The communication I/F 35 is a LAN I/F and a wireless LAN I/F.

<Printer>

The printer 14' of the present modified embodiment has a control program 44 stored in a program storage area 48 of the memory 42, instead of the second program 34. The control program 44 is a program configured to cause the print engine 51 to execute printing and to control communication with the internal mediation apparatus 13 via the communication I/F 45, in cooperation with the OS 43. The control program 44 may be a single program or a group of a plurality of programs.

Also, the communication I/F 45 is an interface capable of performing communication with the internal mediation apparatus 13. The communication I/F 45 is configured to receive a command transmitted from the internal mediation apparatus 13 and to transmit a response to the command to the internal mediation apparatus 13.

<Processing of Program>

In the present modified embodiment, in the local network 16' including the printer 14' and the internal mediation apparatus 13, processing equivalent to the processing executed by the second program 34 of the printer 14 in the embodiment and the modified embodiments (1) to (3) is executed by the second program 34' of the internal mediation apparatus 13. That is, although not shown and described in detail, for example, as disclosed in JP-A-2019-179446, the processing equivalent to step S14, step S22, step S29, step S35, step S36 to step S41, step S54, step S55, step S61, step S62, step S69 to step S75, step S78 to step S80, step S30 and step S70 in FIGS. 3 to 6B and FIGS. 9 to 11B is executed under control of the second program 34' of the internal mediation apparatus 13. The processing or information transmission and reception equivalent to pre-processing or post-processing of each procedure is executed between the internal mediation apparatus 13 and the printer 14'.

<Acquisition of Time Information>

In the present modified embodiment, the internal mediation apparatus 13 has therein a function of generating the time information, which a so-called real time clock and the like. The printer 14, which belongs to a separate local network 16 different from the local network 16' to which the internal mediation apparatus 13 belongs, acquires and uses the time information provided in the internal mediation apparatus 13 by the second program 34. In the below, the processing is described with reference to the flowchart shown in FIG. 7.

That is, in FIG. 4, the second program 34 of the printer 14 determines whether the time information acquisition flag F is 1 (step S200). When it is determined that the time information acquisition flag F is 0 (step S220: No), the second program 34 tries to acquire the time information from the internal mediation apparatus 13 that belongs to a separate local network 16' different from the local network 16 to which the printer 14 belongs (step S210). Similar to the above, the processing that is executed in step S210 is an example of the trying to acquire the time information.

Then, the second program 34 of the printer 14 determines whether the time information is acquired from the internal mediation apparatus 13 (step S220). Similar to the above, the processing that is executed in step S220 is an example of the determining of whether the time information has been successfully acquired. While the time information is not acquired from the internal mediation apparatus 13 (step S220: No), the second program 34 of the printer 14 repeats step S210, and when it is determined that the time information is acquired from the internal mediation apparatus 13 (step S220: Yes), the second program 34 sets the time information acquisition flag F to 1 (step S230).

Then, the second program 34 of the printer 14 performs the information transmission and reception with respect to the external mediation apparatus 12 by using the above-described HTTP request and HTTP response (step S240). On the other hand, in a case where it is determined in step S200 that the time information acquisition flag F is 1 (step S200: Yes), the second program 34 of the printer 14 performs the information transmission and reception with respect to the external mediation apparatus 12 in step S240 without executing step S210, step S220 and step S230.

That is, while the time information is not acquired from the internal mediation apparatus 13 in step S210, the second program 34 does not execute step S240, and in a case where it is determined in step S210 that the time information is acquired from the internal mediation apparatus 13 (step S220: Yes), step S240 is executed, and step S240 is also executed in a case where the time information has already been acquired in the past and the time information acquisition flag F is 1. As a result of the flow of the processing, the processing that is executed in step S240 is an example of the information transmission and reception. Then, the second program 34 of the printer 14 ends the flow.

Effects of Modified Embodiment

As described above, in the present modified embodiment, the internal mediation apparatus 13 capable of performing communication with the external mediation apparatus 12 and generating the time information by itself is provided in the local network 16'. The printer 14' that belongs to the separate local network 16 acquires and uses the time information generated by the internal mediation apparatus 13. Thereby, as compared to a method where the printer 14' acquires separately and independently the time information from a separate external apparatus, it is possible to acquire the time information in a simpler control while reducing the communication traffic in the entire network, so that it is possible to perform smooth communication with the external mediation apparatus 12. Also, in the present modified embodiment, as compared to a case of using the time information acquired from an external device such as the NTP server 1, it is possible to further increase the security.

Note that, instead of the above, the printer 14 may acquire and use, from the printer 14' the time information that the printer 14' in the local network 16' has already acquired from the internal mediation apparatus 13, through the local networks 16' and 16. In this case, the printer 14' is an example of the second printing apparatus. Also in this case, as compared to a method where the printer 14 acquires separately and independently the time information from a separate external apparatus, it is possible to acquire the time information in a simpler control while reducing the communication traffic in the entire network, so that it is possible to perform smooth communication with the external mediation apparatus 12.

(5) Others

In the embodiment, the HTTP request is transmitted to the external mediation apparatus 12 and the external mediation apparatus 12 returns the HTTP response, so that the second instruction command is transmitted from the external mediation apparatus 12 via the firewall. However, other communication protocols may also be used inasmuch as the second instruction command can be transmitted from the external mediation apparatus 12 via the firewall. For example, a communication protocol conforming to XMPPoverBOSH may be used between the external mediation apparatus 12 and the printer 14 or the internal mediation apparatus 13. The second instruction command can be transmitted from the external mediation apparatus 12 to the printer 14 or the internal mediation apparatus 13 via the firewall by communication in a session established as a session start request of XMPPoverBOSH is transmitted from the external mediation apparatus 12 to the printer 14 or the internal mediation apparatus 13 and the external mediation apparatus 12 returns a session start response.

Also, in the embodiment, the printers 14 and 14' that are printing apparatuses have been exemplified as the electronic device that is a management target by the management server 11. However, the present disclosure is not limited thereto. That is, the present disclosure can also be applied to a digital camera, a personal computer, a measurement device, a clock, a code reader, a scanner, a sewing machine, other information devices/communication devices/control devices/diverse machines and the like inasmuch as they are electronic devices capable of performing communication with the external mediation apparatus 12 or the internal mediation apparatus 13. Also in this case, the similar effects can be achieved.

In the embodiment, the sequences and flowcharts shown in FIGS. 3 to 12 are not intended to limit the present disclosure to the procedures shown in the flowcharts. That is, a procedure may be added, deleted, changed and the like without departing from the gist of the disclosure and the technical spirit.

In addition to the above, the embodiment and each modified embodiment can be used with being combined as appropriate.

Also, although not exemplified in detail, the present disclosure can be implemented with being diversely changed without departing from the spirit thereof.

What is claimed is:

1. A printing apparatus comprising:

a printing unit configured to perform printing on a printing medium; and a controller, wherein the printing apparatus is configured to perform communication with an external mediation apparatus configured to perform communication with a management server via an Internet connection, and wherein the controller is configured to:

try to acquire time information necessary for encrypted mutual recognition communication;

determine whether the time information has been successfully acquired; and not execute information transmission and reception with respect to the external mediation apparatus by the mutual recognition communication in a case where the determining does not determine that the time information has been successfully acquired, and executing the information transmission and reception with respect to the external mediation apparatus by the mutual recognition communication in a case where the determining determines that the time information has been successfully acquired.

2. The printing apparatus according to claim 1, wherein the trying to acquire the time information includes trying to acquire the time information from an external apparatus outside the printing apparatus, and wherein the executing of the information transmission and reception includes executing the information transmission and reception with respect to the external mediation apparatus by the mutual recognition communication in a case where the determining determines that the time information has been successfully acquired from the external apparatus.

3. The printing apparatus according to claim 2, wherein the trying to acquire the time information includes trying to acquire the time information from the external apparatus which is a time information distribution server, and wherein the executing of the information transmission and reception includes executing the information transmission and reception with respect to the external mediation apparatus by the mutual recognition communication in a case where the determining determines that the time information has been successfully acquired from the time information distribution server.

4. The printing apparatus according to claim 2, wherein the printing apparatus is configured to perform communication with a first printing apparatus via a local network, the first printing apparatus being configured to perform communication with the external mediation apparatus and being different from the printing apparatus, wherein the trying to acquire the time information includes trying to acquire the time information from the external apparatus which is the first printing apparatus, and wherein the executing of the information transmission and reception includes executing the information transmission and reception with respect to the external mediation apparatus by the mutual recognition communication in a case where the determining determines that the time information has been successfully acquired from the first printing apparatus.

5. The printing apparatus according to claim 2, wherein the printing apparatus is configured to perform communication with an internal mediation apparatus via a local network, the internal mediation apparatus being configured to perform communication with the external mediation apparatus, wherein the trying to acquire the time information includes trying to acquire the time information from the external apparatus which is the internal mediation apparatus, and wherein the executing of the information transmission and reception includes executing the information transmission and reception with respect to the external mediation apparatus by the mutual recognition communication in a case where the determining determines that the time information has been successfully acquired from the internal mediation apparatus.

6. The printing apparatus according to claim 2, wherein the printing apparatus is configured to perform communication with a second printing apparatus via a local network, is the second printing apparatus being configured to perform communication with an internal mediation apparatus which is configured to perform communication with the external mediation apparatus via a local network and being different from the printing apparatus, wherein the trying to acquire the time information includes trying to acquire the time information from the external apparatus which is the second printing apparatus, and wherein the executing of the information transmission and reception includes executing the information transmission and reception with respect to the external mediation apparatus by the mutual recognition communication in a case where the determining determines that the time information has been successfully acquired from the second printing apparatus.

7. The printing apparatus according to claim 1, further comprising an operation unit, wherein the trying to acquire the time information includes trying to acquire the time information corresponding to a time input via the operation unit, and wherein the executing of the information transmission and reception includes executing the information transmission and reception with respect to the external mediation apparatus by the mutual recognition communication in a case where the determining determines that the time information corresponding to the time input via the operation unit has been successfully acquired.

8. The printing apparatus according to claim 1, wherein the trying to acquire the time information is executed each time when power of the printing apparatus is turned on.

9. The printing apparatus according to claim 8, wherein the controller is further configured to:

switching a power supply voltage that is supplied to the printing apparatus to a supply cutoff state in response a reference time having elapsed since a specific operation mechanism of a plurality of operation mechanisms including the printing unit had become a non-operating state; and returning the power supply voltage to a power supplying state based on a predetermined returning operation after the switching of the power supply voltage to the supply cutoff state, and wherein the trying to acquire the time information is executed even in a case where the power of the printing apparatus is turned on by the returning of the power supply voltage to the power supplying state.

10. A non-transitory computer-readable storage medium storing a computer program readable by a computer of an electronic device configured to perform communication with an external mediation apparatus configured to perform communication with a management server via an Internet connection, the computer program, when executed by the computer, causing the electronic device to perform:

trying to acquire time information necessary for encrypted mutual recognition communication;

determining whether the time information has been successfully acquired; and not executing information transmission and reception with respect to the external mediation apparatus by the mutual recognition communication in a case where the determining does not determine that the time information has been successfully acquired, and executing the information transmission and reception with respect to the external mediation apparatus by the mutual recognition communication in a case where the determining determines that the time information has been successfully acquired.

* * * * *

UNITED STATES PATENT AND TRADEMARK OFFICE

CERTIFICATE OF CORRECTION

PATENT NO. : 11,435,963 B2
APPLICATION NO. : 17/144071
DATED : September 6, 2022
INVENTOR(S) : Maya Tabuchi It is certified that error appears in the above-identified patent and that said Letters Patent is hereby corrected as shown below:

In the Claims

Column 28, Line 23, in Claim 6, is corrected to delete the term "is"

Column 28, Line 58, in Claim 9, is corrected to replace the term "switching" with the term "switch"

Column 28, Line 64, in Claim 9, is corrected to replace the term "returning" with the term "return"

Signed and Sealed this
Seventeenth Day of October, 2023

Katherine Kelly Vidal

Katherine Kelly Vidal
*Director of the United States Patent and Trademark Office*